(12) United States Patent
Allison et al.

(10) Patent No.: US 6,946,114 B2
(45) Date of Patent: Sep. 20, 2005

(54) LANTHANIDE-PROMOTED RHODIUM CATALYSTS AND PROCESS FOR PRODUCING SYNTHESIS GAS

(75) Inventors: Joe D. Allison, Ponca City, OK (US); Larry D. Swinney, Ponca City, OK (US); Tianyan Niu, Ponca City, OK (US); Kevin L. Ricketson, Ponca City, OK (US); Daxiang Wang, Ponca City, OK (US); Sriram Ramani, Ponca City, OK (US); Gloria I. Straguzzi, Ponca City, OK (US); David M. Minahan, Ponca City, OK (US); Harold A. Wright, Ponca City, OK (US); Baili Hu, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 362 days.

(21) Appl. No.: 09/946,305

(22) Filed: Sep. 5, 2001

(65) Prior Publication Data

US 2002/0115730 A1 Aug. 22, 2002

Related U.S. Application Data

(60) Provisional application No. 60/229,595, filed on Sep. 5, 2000.

(51) Int. Cl.$^7$ ................................................. C01B 3/26
(52) U.S. Cl. .................. 423/651; 252/373; 502/302; 502/325
(58) Field of Search .................... 252/373; 423/651; 502/302, 325

(56) References Cited

U.S. PATENT DOCUMENTS

| | | |
|---|---|---|
| 4,601,859 A | 7/1986 | Galle et al. |
| 5,023,276 A | 6/1991 | Yarrington .................. 514/703 |
| 5,149,464 A | 9/1992 | Green ......................... 252/373 |
| 5,431,855 A | 7/1995 | Green ......................... 252/373 |
| 5,447,705 A | 9/1995 | Petit ......................... 423/418.2 |
| 5,500,149 A | 3/1996 | Green ......................... 252/373 |
| 5,510,056 A | 4/1996 | Jacobs ........................ 252/373 |
| 5,648,582 A | 7/1997 | Schmidt ....................... 585/652 |
| 6,447,745 B1 * | 9/2002 | Feeley et al. ............. 423/648.1 |

FOREIGN PATENT DOCUMENTS

| | | | |
|---|---|---|---|
| EP | 0303438 | 2/1989 | ............ C01B/3/38 |
| EP | 0333037 | 9/1989 | ............ C01B/3/40 |
| EP | 0 558 343 A1 | 1/1993 | |
| EP | 0640561 | 3/1995 | ............ C01B/3/40 |
| EP | 0974551 | 1/2000 | ............ C01B/3/40 |
| WO | WO9301130 | 1/1993 | ........... C01B/31/18 |
| WO | WO96/16737 | 6/1996 | ............ B01J/37/02 |
| WO | WO 99/37580 | 7/1999 | ............ C01B/3/40 |
| WO | WO99/48805 | 9/1999 | ............ C01B/3/40 |

OTHER PUBLICATIONS

European Search Report, EP 01 97 0632 dated Aug. 14, 2003, 2 pages.

(Continued)

*Primary Examiner*—Stanley S. Silverman
*Assistant Examiner*—Maribel Medina
(74) *Attorney, Agent, or Firm*—Conley Rose P.C.

(57) ABSTRACT

Lanthanide-promoted rhodium-containing supported catalysts that are active for catalyzing the net partial oxidation of methane to CO and $H_2$ are disclosed, along with their manner of making and high efficiency processes for producing synthesis gas employing the new catalysts. A preferred catalyst comprises highly dispersed, high surface area rhodium on a granular zirconia support with an intermediate coating of a lanthanide metal and/or oxide thereof and is thermally conditioned during catalyst preparation. In a preferred syngas production process a stream of methane-containing gas and $O_2$ is passed over a thermally conditioned, high surface area Rh/Sm/zirconia granular catalyst in a short contact time reactor to produce a mixture of carbon monoxide and hydrogen.

97 Claims, 8 Drawing Sheets

OTHER PUBLICATIONS

S. Bernal et al., "Influence of the preparation procedure on the chemical and microstructural properties of lanthana promoted $Rh/SiO_2$ catalysts A FTIR spectroscopic study of chemisorbed CO", Journal of Alloys and Compounds 250 (1997) 461–466.

Michael F. Mark et al., "$CO_2$–Reforming of Methane on Supported Rh and Ir Catalysts", Journal of Catalysis 164 (1996) 122–130.

Qian–Gu Yan et al., "Promoting Effect of Rare Earth Oxides On $Ni/Re_xO_y$–$Al_2O_3$ Catalyst for Partial Oxidation of Methane to Synthesis Gas", Journal of Natural Gas Chemistry, vol. 6, No. 2 (1997) 93–100.

V.R. Choudhary et al., "Oxidative Conversion of Methane to Syngas over Nickel Supported on Commercial Low Surface Arca Porous Catalyst Carriers Precoated with Alkaline and Rare Earth Oxides", Journal of Catalysis, vol. 172, No. 2 (1997) 281–293.

(PCT) Results of Partial International Search.

Geankoplis, Christie J.; *Transport Processes and Unit Operations*; p. 837; 1983.

Maximilian Fichtner, et al; *Microstructured Rhodium Catalysis for the Partial Oxidation of Methane to Syngas Under Pressure*; Ind. Eng. Chem. Res 2001, 40:3475–3483.

A.G. Dietz III and L.D. Schmidt: *Effect of Pressure on Three Catalytic Partial Oxidation Reactions at Millisecond Contact Times*; Catalysis Letters 33 (1995) 15–29.

A.T. Ashcroft. et al: *Selective Oxidation of Methane to Synthesis Gas Using Transition Metal Catalysts*: Letters to Nature, vol. 344, 1990.

Patrick D.F. Vernon, et al: *Partial Oxidation of Methane to Synthesis Gas*: Catalysis Letters 6 (1990) 181–186.

K. L. Hohn and L.D. Schmidt: *Partial Oxidation of Methane to Syngas at High Space Velocities Over Rh–coated Spheres*; Applied Catalysis A: General 211 (2001) 53–68.

Jacek A. Lapszewicz and Xuan–Zhen Jiang: *Characteristics and Performance of Catalysts for Partial Oxidation of Natural Gas to Syngas*; Symposium on Chemistry and Characterization of Supported Metal Catalysts Presented Before the Division of Petroleum Chemistry, Inc., $206^{th}$ National Meeting. American Chemical Society, Chicago, IL; Aug. 23–27, 1993.

A. Cybulski and Jacob A. Moulijin: *Structured Catalyst and Reactors: Transformation of Structured Carrier into Structured Catalyst*, Chapter 21, pp 599–615, 1998.

Tsang, S.C. et al, *Recent Advances in the Coversion of Methane to Synthesis Gas. Catal.* Today 23:3–15 (1995).

Yuzaki, Koichi et al., *Catalytic Decomposition of $N_2O$ Over Supported Rhodium Catalysts: High Activities of Rh/USY and $Rh/AL_2O_2$ and the Effect of Rh Precursors*, Catalysis Letters 47 (1997) 173–175.

E. Ruckenstein and H.Y. Wang; *Partial Oxidation of Methane to Synthesis Gas Over MgO–supported Rh Catalysts; the Effect of Precursor of MgO*; Applied Catalysis A; General 198 (2000) 33–41.

* cited by examiner

LANTHANIDE-PROMOTED RHODIUM CATALYSTS AND PROCESS FOR PRODUCING SYNTHESIS GAS

CROSS REFERENCE TO RELATED APPLICATIONS

This application claims the benefit under 35 U.S.C. § 119(e) of U.S. Provisional Patent Application No. 60/229,595 filed Sep. 5, 2000.

BACKGROUND OF THE INVENTION

1. Field of the Invention

The present invention generally relates to processes for the catalytic partial oxidation of hydrocarbons (e.g., natural gas) to produce a mixture of carbon monoxide and hydrogen ("synthesis gas" or "syngas").

2. Description of Related Art

The quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas intermediate is converted to higher hydrocarbon products by processes such as the Fischer-Tropsch Synthesis. For example, fuels with boiling points in the middle distillate range, such as kerosene and diesel fuel, and hydrocarbon waxes may be produced from the synthesis gas.

Current industrial use of methane as a chemical feedstock proceeds by the initial conversion of methane to carbon monoxide and hydrogen by either steam reforming, which is the most widespread process, or by dry reforming or by autothermal reforming. Steam reforming currently is the major process used commercially for the conversion of methane to synthesis gas, proceeding according to Equation 1.

$$CH_4 + H_2O \leftrightarrow CO + 3H_2 \qquad (1)$$

Although steam reforming has been practiced for over five decades, efforts to improve the energy efficiency and reduce the capital investment required for this technology continue. For many industrial applications, the 3:1 ratio of $H_2$:CO products is problematic, and the typically large steam reforming plants are not practical to set up at remote sites of natural gas formations.

Methane residence times in steam reforming are on the order of 0.5–1 second, whereas for heterogeneously catalyzed partial oxidation, the residence time is on the order of a few milliseconds. For the same production capacity, syngas facilities for the partial oxidation of methane can be far smaller, and less expensive, than facilities based on steam reforming. A recent report (M. Fichtner et al. *Ind. Eng. Chem. Res.* (2001) 40:3475–3483) states that for efficient syngas production, the use of elevated operation pressures of about 2.5 MPa is required. Those authors describe a partial oxidation process in which the exothermic complete oxidation of methane is coupled with the subsequent endothermic reforming reactions (water and $CO_2$ decomposition). This type of process can also be referred to as autothermal reforming or ATR, especially when steam is co-fed with the methane. Certain microstructured rhodium honeycomb catalysts are employed which have the advantage of a smaller pressure drop than beds or porous solids (foams) and which resist the reaction heat of the total oxidation reaction taking place at the catalyst inlet.

The catalytic partial oxidation ("CPOX") or direct partial oxidation of hydrocarbons (e.g., natural gas or methane) to syngas has also been described in the literature. In catalytic partial oxidation, natural gas is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 2.

$$CH_4 + \tfrac{1}{2}O_2 \rightarrow CO + 2H_2 \qquad (2)$$

This ratio is more useful than the $H_2$:CO ratio from steam reforming for the downstream conversion of the syngas to chemicals such as methanol or to fuels. The CPOX reaction is exothermic, while the steam reforming reaction is strongly endothermic. Furthermore, oxidation reactions are typically much faster than reforming reactions. This allows the use of much smaller reactors for catalytic partial oxidation processes that is possible in a conventional steam reforming process.

While its use is currently limited as an industrial process, the direct partial oxidation or CPOX of methane has recently attracted much attention due to its inherent advantages, such as the fact that due to the significant heat that is released during the process, there is no requirement for the continuous input of heat in order to maintain the reaction, in contrast to steam reforming processes. An attempt to overcome some of the disadvantages and costs typical of steam reforming by production of synthesis gas via the catalytic partial oxidation of methane is described in European Patent No. 303,438. According to that method, certain high surface area monoliths coated with metals or metal oxides that are active as oxidation catalysts, e.g., Pd, Pt, Rh, Ir, Os, Ru, Ni, Cr, Co, Ce, La, and mixtures thereof, are employed as catalysts. Other suggested coating metals are noble metals and metals of groups IA, IIA, III, IV, VB, VIB, or VIIB of the periodic table of the elements.

U.S. Pat. No. 5,149,464 describes a method for selectively converting methane to syngas at 650–950° C. by contacting a methane/oxygen mixture with a solid catalyst which is a d-block transition metal on a refractory support, an oxide of a d-block transition metal, or a compound of the formula $M_xM'_yO_z$ wherein M' is a d-block transition metal and M is Mg, B, Al, Ga, Si, Ti, Zr, Hf or a lanthanide. U.S. Pat. No. 5,500,149 describes the combination of dry reforming and partial oxidation of methane, in the presence of added $CO_2$ to enhance the selectivity and degree of conversion to synthesis gas. U.S. Pat. No. 5,431,855 demonstrates the catalytic conversion of mixtures of $CO_2$, $O_2$ and $CH_4$ to synthesis gas over selected alumina supported transition metal catalysts. Maximum CO yield reported was 89% at a gas hourly space velocity (GHSV) of $1.5\times10^4$ $hr^{-1}$, temperature of 1,050° K. and pressure of 100 kPa. The addition of $CO_2$ tends to reduce the $H_2$:CO ratio of the synthesis gas, however.

For successful commercial scale operation a catalytic partial oxidation process must be able to achieve a high conversion of the methane feedstock at high gas hourly space velocities, and the selectivity of the process to the desired products of carbon monoxide and hydrogen must be high. Dietz III and Schmidt (*Catalysis Letters* (1995) 33:15–29) describe the effects of 1.4–6 atmospheres pressure on methane conversion and product selectivities in the direct oxidation of methane over a Rh-coated foam monolith. The selectivities of catalytic partial oxidation to the desired products, carbon monoxide and hydrogen, are controlled by several factors. One of the most important of these factors is the choice of catalyst composition. In most of the existing syngas production processes it is difficult to select a catalyst that will be economical for large scale industrial use, yet will provide the desired level of activity and selectivity for CO and $H_2$ and demonstrate long on-stream life. Moreover, such high conversion and selectivity levels must be achieved without detrimental effects to the catalyst, such as the formation of carbon deposits ("coke") on the catalyst, which severely reduces catalyst performance. Accordingly, substantial effort in this field continues to be devoted to the development of catalysts allowing commercial performance without coke formation. Also, in order to overcome the relatively high pressure drop associated with gas flow through a fixed bed of catalyst particles, and to make possible the operation of the reactor at high gas space velocities, various types of structures for supporting the active catalyst in the reaction zone have been proposed. For example, U.S. Pat. No. 5,510,056 discloses a monolithic support such as a ceramic foam or fixed catalyst system having a specified tortuosity and number of interstitial pores that is said to allow operation at high gas space velocity. Catalysts used in that process include ruthenium, rhodium, palladium, osmium, iridium, and platinum. Data are presented in that patent for a ceramic foam supported rhodium catalyst at a rhodium loading of from 0.5–5.0 wt %.

U.S. Pat. No. 5,648,582 also discloses a process for the catalytic partial oxidation of a feed gas mixture consisting essentially of methane. The methane-containing feed gas mixture and an oxygen-containing gas are passed over an alumina foam supported metal catalyst at space velocities of 120,000 hr.$^{-1}$ to 12,000,000 hr.$^{-1}$ The catalytic metals exemplified are rhodium and platinum, at a loading of about 10 wt %.

Vernon, D. F. et al. (*Catalysis Letters* 6:181–186 (1990)) describe the partial oxidation of methane to synthesis gas using various transition metal catalysts such as Pd, Pt, Ru or Ni on alumina, or certain transition metal oxides including $Pr_2Ru_2O_7$ and $Eu_2Ir_2O_7$, under a range of conditions.

U.S. Pat. No. 5,447,705 discloses a catalyst for the partial oxidation of methane having a perovskite crystalline structure and the general composition: $Ln_xA_{1-y}B_yO_3$, wherein Ln is a lanthanide and A and B are different metals chosen from Group IVb, Vb, VIb, VIIb or VIII of the Periodic Table of the Elements.

K. L. Hohn and L. D. Schmidt (*Applied Catalysis* A: General (2001) 211:53–68) describe the effect of space velocity on the partial oxidation of methane using two types of catalyst support geometries. Synthesis gas production by certain rhodium coated monoliths and spheres is discussed, and it is suggested that differences in heat transfer within the two support geometries may play a major role in the different results in catalytic performance observed between spheres and monoliths at increased space velocity. Factors other than chemistry, such as mass and heat transfer within the catalyst region, appear to be important at high flow rates.

PCT Patent Application Publication No. WO 93/01130 describes another catalyst for the production of carbon monoxide from methane. The catalyst is composed of Pd, Pt, Rh or Ir on a pure lanthanide oxide, which may be carried on a ceramic support, preferably zirconia. Pd on $Sm_2O_3$ gives relatively low selectivity for either CO or $CO_2$, compared to the selectivities reported for the other compositions evaluated in that study. The methane conversion process is performed with supplied heat, the feed gases comprise very low amount of $O_2$, and very low amounts of $H_2$ are produced as a byproduct of the process.

A. T. Ashcroft, et al. (*Nature* 344:319–321 (1990)) describe the selective oxidation of methane to synthesis gas using ruthenium-lanthanide containing catalysts. The reaction was carried out at a gas hourly space velocity (GHSV) of $4 \times 10^4$ hr$^{-1}$ and normal atmospheric pressure. A nitrogen diluent was employed to enhance activity and selectivity.

Lapszewicz, et al. (proceedings of the Symposium on Chemistry and Characterization of Supported Metal Catalysts presented before the Division of Petroleum Chemistry, Inc. 206$^{th}$ National Meeting, American Chemical Society, Chicago, Ill., (Aug. 22–27, 1993) pp. 815–818) describe the use of certain Rh catalysts on pure $Sm_2O_3$ and Pt group metals on MgO for catalyzing the partial oxidation of natural gas to syngas. That report focuses on $CH_4$ conversion to carbon monoxide, which reaches a maximum level of 80% using 0.5% Rh on $Sm_2O_3$ as the catalyst.

Ruckenstein and Wang (Appl. Catal., A (2000), 198:33–41) describe certain MgO supported Rh catalysts which, at 750° C. and 1 atm, provided a conversion >80% and selectivities of 95–96% to CO and 96–98% to $H_2$, at the high space velocity of $7.2 \times 10^5$ mL/g$^{-1}$h$^{-1}$, with very high stability. Those authors report that there was no significant deactivation of the catalyst for up to 96 h of reaction. The strong interactions between rhodium and magnesium oxides are suggested to be responsible for the high stability of the catalyst. In today's syngas production processes, productivity typically falls off when the process is operated at superatmospheric pressure.

Another potential disadvantage of many of the existing catalytic hydrocarbon conversion methods is the need to include steam in the feed mixture to suppress coke formation on the catalyst. Typically, the ratio of steam to methane, or other light hydrocarbon, in the feed gas must be maintained at 1:1 or greater. The volume of gaseous $H_2O$ significantly reduces the available reactor space for the production of synthesis gas. Another disadvantage of using steam in the production of syngas is that steam increases the production of $CO_2$, which is carbon that is lost to the process of making CO product. Other existing methods have the potential drawback of requiring the input of a $CO_2$ stream in order to enhance the yield and selectivity of CO and $H_2$ products. Another drawback of some existing processes is that the catalysts that are employed often result in the production of significant quantities of carbon dioxide, steam, and $C_2$+ hydrocarbons. This often renders the product gas mixture unsuitable, for example, for feeding directly into a Fischer-Tropsch type catalytic system for further processing into higher hydrocarbon products. Moreover, for efficient syngas production, the use of elevated operation pressures is necessary in order to ensure the direct transition to a downstream process, such as a Fischer-Tropsch process, without the need for intermediate compression.

At the present time, none of the known processes appear capable of sufficiently high space-time yields. Typically, partial oxidation reactor operation under pressure is problematic because of shifts in equilibrium, undesirable secondary reactions, coking and catalyst instability. Another problem frequently encountered is loss of noble metals due to catalyst instability at higher operating temperatures. Although advancement has been made toward providing higher levels of conversion of reactant gases and better selectivities for CO and $H_2$ reaction products, problems still remain with finding sufficiently stable and long-lived catalysts capable of conversion rates that are attractive for large scale industrial use. Accordingly, a continuing need exists for better processes and catalysts for the production of synthesis gas, particularly from methane or methane containing feeds. In such improved processes the catalysts would be stable at high temperatures and resist coking. They would also retain a high level of conversion activity and selectivity to carbon monoxide and hydrogen under conditions of high gas space velocity and elevated pressures for long periods of time on-stream.

SUMMARY OF THE INVENTION

The present invention provides a process and catalysts that overcome many of the problems associated with existing processes and catalysts and for the first time, make possible the high space-time yields that are necessary for a commercially feasible syngas production facility. A process of preparing synthesis gas using supported lanthanide-promoted rhodium catalysts for the catalytic partial oxidation (CPOX) of methane or natural gas is disclosed. One advantage of the new catalysts employed in the process is that they demonstrate a high level of activity and selectivity to carbon monoxide and hydrogen under conditions of high gas hourly space velocity, elevated pressure and high temperature. The new catalyst structures contain increased surface area catalytic materials, which overcome some of the drawbacks of previous rhodium-based catalysts, to provide higher conversion and syngas selectivity. In addition, the use of a family of lanthanide elements that show superior activity for syngas generation under a variety of operating conditions, and at lower temperatures than that reported in earlier work is demonstrated. Also these new catalysts have been demonstrated to operate successfully at pressures above atmospheric pressure for longer periods of time onstream, over multi-day syngas production runs, without coking. The improved stability also manifests itself in terms of more constant reactor exit temperatures and product gas compositions.

In accordance with certain embodiments of the present invention a method or process of converting methane or natural gas and $O_2$ to a product gas mixture containing CO and $H_2$, preferably in a molar ratio of about 2:1 $H_2$:CO, is provided. The process comprises mixing a methane-containing feedstock and an $O_2$ containing feedstock to provide a reactant gas mixture feedstock. Natural gas, or other light hydrocarbons having from 2 to 5 carbon atoms, and mixtures thereof, may also serve as satisfactory feedstocks. The $O_2$ containing feedstock may be pure oxygen gas, or may be air or $O_2$-enriched air. The reactant gas mixture may also include incidental or non-reactive species, in lesser amounts than the primary hydrocarbon and oxygen components. Some such species are $H_2$, CO, $N_2$, NOx, $CO_2$, $N_2O$, Ar, $SO_2$ and $H_2S$, as can exist normally in natural gas deposits. Additionally, in some instances, it may be desirable to include nitrogen gas in the reactant gas mixture to act as a diluent. Nitrogen can be present by addition to the reactant gas mixture or can be present because it was not separated from the air that supplies the oxygen gas. The reactant gas mixture is fed into a reactor where it comes into contact with a catalytically effective amount of a lanthanide-containing or lanthanide-coated rhodium-containing catalyst structure, catalyst or catalyst system. Preferably the lanthanide is Pr, Nd, Pm, Sm, Eu, Gd, Tb, Dy, Ho, Er, Tm or Yb, more preferably Pr, Sm, and Yb. Advantageously, certain preferred embodiments of the process are capable of operating at superatmospheric reactant gas pressures (preferably in excess of 2 atmospheres or about 200 kPa) to efficiently produce synthesis gas.

In accordance with certain embodiments of the present invention, a method of partially oxidizing a reactant gas mixture comprising a light hydrocarbon and oxygen to form a product mixture containing carbon monoxide and hydrogen is provided. This method comprises, in a reactor, passing the reactant gas mixture over a highly dispersed, high surface area rhodium based catalyst structure such that the reactant gas mixture is exposed to a significant portion of the rhodium. The catalyst structure employed in the reactor is characterized by having a high metal surface area (i.e., at least 1.25 square meters of metal per gram of catalyst structure), preferably at least 1.5 $m^2/g$, and more preferably at least 2 $m^2/g$. Preferably the metal is rhodium and the rhodium surface area at least 1.25 square meters of metal per gram of supported catalyst, preferably at least 1.5 $m^2/g$, and more preferably at least 2 $m^2/g$. The term "highly dispersed rhodium" refers to a catalyst in which a limited amount of rhodium is spread out over the high surface area catalyst surfaces such that the availability of rhodium for contacting the reactant gas is enhanced.

According to certain preferred embodiments of the present invention, a highly productive process for partially oxidizing a reactant gas mixture comprising methane and oxygen to form synthesis gas comprising carbon monoxide and hydrogen is provided. This process comprises passing the reactant gas mixture over a high surface area catalyst structure in a reactor under process conditions that include maintaining a molar ratio of methane to oxygen ratio in the range of about 1.5:1 to about 3.3:1, the gas hourly space velocity is maintained in excess of about 20,000 $hr^{-1}$, the reactant gas mixture is maintained at a pressure in excess of about two atmospheres and at a preheat temperature of between about 30° C. and 750° C. Under these process conditions within the reactor, the high surface area catalyst structure causes the partial oxidation of the methane to proceed at high productivity, i.e., with at least 85% methane conversion, 85% selectivity to carbon monoxide and 85% selectivity to hydrogen. In preferred embodiments, the productivity is at least 90% methane conversion, 90% selectivity to carbon monoxide, and 90% selectivity to hydrogen, more preferably at least 95% methane conversion, 95% selectivity to carbon monoxide and 95% selectivity to hydrogen. In preferred embodiments the catalyst used for producing synthesis gas comprises about 0.005 to 25 wt % Rh, preferably 0.05 to 25 wt % Rh, and about 0.005 to 25 wt % of a lanthanide element (i.e., La, Ce, Pr, Nd, Pm, Sm, Eu, Gd, Tb, Dy, Ho, Er, Tm, Yb and Lu) in the form of the metal and/or metal oxide coating a refractory monolith or coating a plurality of distinct or discrete structures or particulates. Weight percents (wt %) refer to the weight of rhodium or lanthanide metal relative to the total weight of the catalyst and support. In some embodiments, the lanthanide is preferably other than lanthanum or cerium. The more preferred compositions contain 0.5–10 wt % Rh and 0.5–10 wt % Sm on a refractory support. In certain preferred embodiments the ratio of rhodium to lanthanide is in the range of about 0.5–2. The terms "distinct" or "discrete" structures or units, as used herein, refer to supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures have a maximum characteristic length (i.e., longest dimension) of less than six millimeters, preferably less than three millimeters. The term "monolith" as used herein is any singular piece of material of continuous manufacture such as solid pieces of metal or metal oxide or foam materials or honeycomb structures. In some embodiments, two or more catalyst monoliths are stacked in the catalyst zone of the reactor. In any case, the new Rh-Lanthanide catalyst systems or catalyst beds have sufficient porosity, or sufficiently low resistance to gas flow, to permit a stream of said reactant gas mixture to pass over the catalyst at a gas hourly space velocity (GHSV) of at least about 20,000 hr$^{-1}$, which corresponds to a weight hourly space velocity (WHSV) of about 200 hr$^1$, when the reactor is operated to produce synthesis gas. Preferably the reactor is operated at a reactant gas pressure greater than 2 atmospheres, which is advantageous for optimizing syngas production space-time yields.

In some embodiments, the reactant gas mixture is preheated to about 30° C.–750° C. before contacting the catalyst. The preheated feed gases pass through the catalytic materials to the point at which the partial oxidation reaction initiates. An overall or net catalytic partial oxidation (CPOX) reaction ensues, and the reaction conditions are maintained to promote continuation of the process, which preferably is sustained autothermally.

For the purposes of this disclosure, the term "net partial oxidation reaction" means that the partial oxidation reaction shown in Reaction 2, above, predominates. However, other reactions such as steam reforming (see Reaction 1), dry reforming (Reaction 3) and/or water-gas shift (Reaction 4) may also occur to a lesser extent.

$$CH_4 + CO_2 \leftrightarrow 2CO + 2H_2 \quad (3)$$

$$CO + H_2O \leftrightarrow CO_2 + H_2 \quad (4)$$

The relative amounts of the CO and $H_2$ in the reaction product mixture resulting from the catalytic net partial oxidation of the methane, or natural gas, and oxygen feed mixture are about 2:1 $H_2$:CO, similar to the stoichiometric amounts produced in the partial oxidation reaction of Reaction 2.

As used herein, the term "autothermal" means that after initiation of the partial oxidation reaction, no additional or external heat must be supplied to the catalyst in order for the production of synthesis gas to continue. Under autothermal reaction conditions the feed is partially oxidized and the heat produced by that exothermic reaction drives the continued net partial oxidation reaction. Consequently, under autothermal process conditions there is no external heat source required. The net partial oxidation reaction conditions are promoted by optimizing the concentrations of hydrocarbon and $O_2$ in the reactant gas mixture, preferably within the range of about a 1.5:1 to about 3.3:1 ratio of carbon:$O_2$ by weight. In some embodiments, steam may also be added to produce extra hydrogen and to control the outlet temperature. The ratio of steam to carbon by weight ranges from 0 to 1. The carbon:$O_2$ ratio is the most important variable for maintaining the autothermal reaction and the desired product selectivities. Pressure, residence time, amount of feed preheat and amount of nitrogen dilution, if used, also affect the reaction products. The process also includes maintaining a catalyst residence time of no more than about 10 milliseconds for the reactant gas mixture. This is accomplished by passing the reactant gas mixture over, or through the porous structure of the catalyst system at a gas hourly space velocity of about 20,000–100,000,000 hr$^{-1}$, preferably about 100,000–25,000,000 hr$^{-1}$. This range of preferred gas hourly space velocities corresponds to a weight hourly space velocity of 1,000 to 25,000 hr$^{-1}$. In preferred embodiments of the process, the catalyst system catalyzes the net partial oxidation of at least 90% of a methane feedstock to CO and $H_2$ with a selectivity for CO and $H_2$ products of at least about 90% CO and 90% $H_2$.

In certain embodiments of the process, the step of maintaining net partial oxidation reaction promoting conditions includes keeping the temperature of the reactant gas mixture at about 30° C.–750° C. and keeping the temperature of the catalyst at about 600–2,000° C., preferably between about 600–1,600° C., by self-sustaining reaction. In some embodiments, the process includes maintaining the reactant gas mixture at a pressure of about 100–32,000 kPa (about 1–320 atmospheres), preferably about 200–10,000 kPa (about 2–100 atmospheres), while contacting the catalyst.

In some embodiments, the process comprises mixing a methane-containing feedstock and an $O_2$-containing feedstock together in a carbon:$O_2$ ratio of about 1.5:1 to about 3.3:1, preferably about 1.7:1 to about 2.1:1, and more preferably about 2:1). Preferably the methane-containing feedstock is at least 80% methane, more preferably at least 90%.

According to certain embodiments of the present invention, a method of converting a light hydrocarbon and $O_2$ to a product mixture containing CO and $H_2$ is provided. The process includes forming a reactant gas mixture comprising a light hydrocarbon containing gas and an $O_2$ containing gas, and, in a reactor, passing the reactant gas mixture over a refractory supported rhodium-lanthanide catalyst prepared by sequentially applying a rhodium precursor, such as a rhodium salt, to a lanthanide and/or lanthanide oxide precursor, such as a lanthanide salt, to the support and stabilizing the catalyst. The term "refractory support" refers to any material that is mechanically stable to the high temperatures of a catalytic partial oxidation reaction, which is typically 500° C.–1,600° C., but may be as high as 2000° C. Suitable refractory support materials include zirconia, magnesium stabilized zirconia, zirconia stabilized alumina, yttrium stabilized zirconia, calcium stabilized zirconia, alumina, cordierite, titania, silica, magnesia, niobia, vanadia and the like. Preferably the alumina component is alpha-alumina. Stabilizing includes thermally conditioning the catalyst.

The catalyst employed in the method is preferably prepared by sequentially applying a lanthanide precursor and a rhodium precursor to a refractory support and thermally conditioning the catalyst during catalyst preparation. "Thermally conditioning" means that when the catalyst is being constructed (e.g., after the lanthanide precursor is applied to the refractory support and/or after the rhodium precursor is applied to the lanthanide and/or lanthanide oxide), it is subjected to two or more heat treatments which yield a more stable and long lived catalyst for use in the CPOX reactor. Each heat treatment includes calcining the catalyst, or an intermediate stage of the catalyst, according to a defined heating and cooling program. Preferably the final heat treatment includes heating at a temperature that approaches or approximates the operating temperature of the CPOX reactor. It is also preferable to apply the lanthanide or lanthanide oxide precursor compound to a refractory support first, followed by a programmed heat treatment, to further enhance catalyst stability when used onstream in a CPOX reactor. Although less preferred, the lanthanide may instead be applied over the rhodium, or the rhodium and lanthanide precursor compounds may be mixed together and applied to a refractory support, followed by one or more thermally conditioning treatments.

In certain embodiments, thermally conditioning comprises heating the catalyst at a predetermined heating rate up to a first temperature and then heating said catalyst at a predetermined heating rate from the first temperature to a second temperature. In some embodiments of the catalyst preparation method, the thermally conditioning also includes holding the catalyst, at the first and second temperatures for predetermined periods of time. In some embodiments, the first temperature is about 125–325° C. and the second temperature is about 300 to 900° C., preferably about 500–700° C. In some embodiments the heating rate is about 1–10° C./min, preferably 3–5° C./min and the dwell time at that temperature is about 120–360 min, or more, preferably about 180 min.

In some embodiments, thermally conditioning the catalyst includes heat treating the catalyst between the sequential applications of lanthanide and/or lanthanide oxide precursor compound and rhodium precursor compound to said support, i.e., treating an intermediate-stage catalyst. In some embodiments, the catalyst preparation method also includes reducing the catalyst at a predetermined temperature in a reducing atmosphere. The resulting Rh-lanthanide containing catalyst is characterized by its enhanced activity for catalyzing the partial oxidation of light hydrocarbons such as methane, compared to other rhodium-based catalysts.

In certain embodiments of the syngas production process, the reactor is operated at the above-described process conditions to favor autothermal catalytic partial oxidation of the hydrocarbon feed and to optimize the yield and selectivity of the desired CO and $H_2$ products.

In accordance with other embodiments of the present invention, a catalyst is provided that is active for catalyzing the net partial oxidation of methane to CO and $H_2$ and possesses enhanced stability on stream in a short contact time reactor. The catalyst comprises rhodium and at least one lanthanide or lanthanide oxide, preferably carried on a refractory support, or is formed as a self supporting structure or plurality of structures suitable for use in the catalyst zone of a short contact time reactor to produce synthesis gas.

In some embodiments of the process and catalyst of the present invention, the catalyst system also comprises a support which is magnesium stabilized zirconia, zirconia stabilized alumina, yttrium stabilized zirconia, calcium stabilized zirconia, alumina, cordierite, zirconia, titania, silica, magnesia, niobia, vanadia or the like. In certain preferred embodiments the catalyst comprises about 0.005 to 25 wt % Rh and about 0.005 to 25 wt % of a lanthanide and/or lanthanide oxide deposited on a porous refractory support, especially PSZ, alpha-alumina or zirconia. In certain preferred embodiments the lanthanide is samarium. In certain embodiments Rh and a lanthanide metal and/or lanthanide oxide are deposited on a monolith support that contains about 45–80 pores per linear inch. In other preferred embodiments the catalyst and support comprise a plurality of distinct or discrete structures or particulates, characterized as described above.

In some embodiments the catalyst comprises about 0.05–25 wt % Rh and about 0.1–25 wt % lanthanide and/or lanthanide oxide, preferably about 0.5–10 wt % Rh and 0.5–10 wt % lanthanide and/or lanthanide oxide (wt % lanthanide based on total weight of the supported catalyst). In preferred embodiments the lanthanide is deposited intermediate the support and a Rh layer. In some embodiments, the catalyst system comprises about 0.5–10 wt % Rh over a layer of about 0.5–10 wt % lanthanide, preferably samarium, ytterbium or praseodymium, and oxides thereof, more preferably samarium and/or samarium oxide, deposited on a PSZ or alumina monolith, or, more preferably, on alpha-alumina or zirconia granules having the size characteristics described above. In other embodiments, Rh is deposited between the monolith support and the lanthanide and/or lanthanide oxide layer. In still other embodiments, a mixture of lanthanide and Rh is deposited on the support. In any case, the catalyst is preferably subjected to one or more thermally conditioning treatments during catalyst construction, as previously described, to yield a more pressure tolerant, high temperature resistant and longer lived catalyst system than is presently available in conventional syngas or catalytic partial oxidation catalysts. These and other embodiments, features and advantages of the present invention will become apparent with reference to the following description and drawings.

DETAILED DESCRIPTION OF PREFERRED EMBODIMENTS

Figure 1:
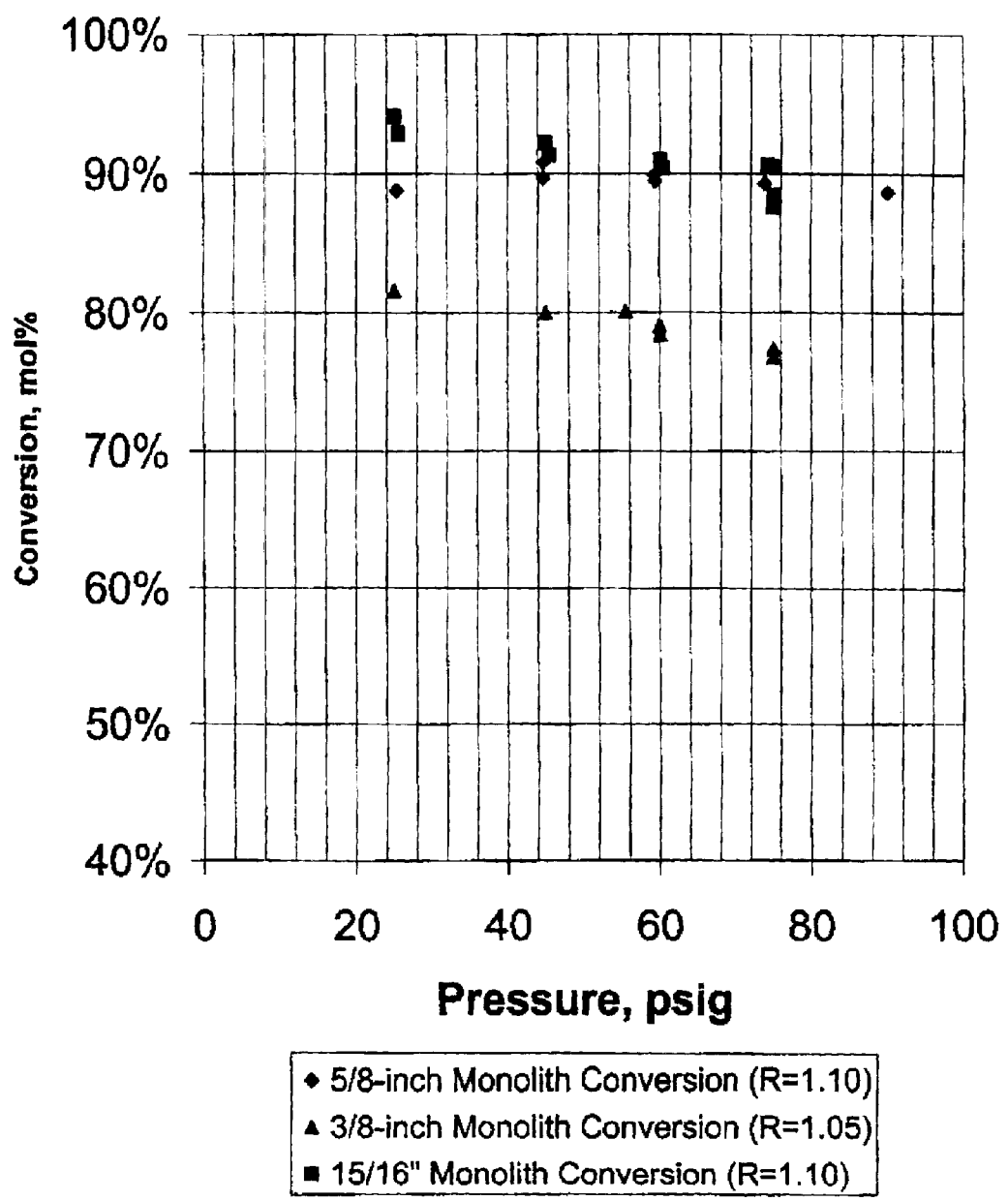
FIG. 1 is a graph showing the carbon conversion activity (y-axis) at various reactant gas pressures (x-axis) obtained using ⅜", ⅝" and ¹⁵⁄₁₆" long Rh—Sm-containing monolith catalysts tested under similar conditions. R is the ratio of $O_2$:natural gas (by mass).

New Rh-lanthanide based syngas catalysts are preferably prepared by impregnating or washcoating the catalytically active components onto a refractory porous ceramic monolith carrier or support. "Lanthanide" refers to a rare earth element La, Ce, Pr, Nd, Pm, Sm, Eu, Gd, Tb, Dy, Ho, Er, Tm, Yb and Lu. Suitable supports include partially stabilized zirconia (PSZ) foam (stabilized with Mg, Ca or Y), or foams of α-alumina, corderite, titania, mullite, Zr-stabilized α-alumina, or mixtures thereof. The term "partially stabilized zirconia" (PSZ) refers to the well-known practice of adding stabilizing oxides, such as MgO, CaO, or $Y_2O_3$, into the $ZrO_2$ structure in a sufficient to form a solid solution or a mixture of $ZrO_2$ in different phases. The resulting material as higher resistance to phase transformation during heating and cooling compared to pure $ZrO_2$. A referred laboratory-scale ceramic monolith support is porous PSZ foam with approximately 6,400 channels per square inch (80 pores per linear inch). Preferred foams for use in the preparation of the catalyst include those having from 30 to 150 pores per inch (12 to 60 pores per centimeter). The monolith can be cylindrical overall, with a diameter corresponding to the inside diameter of the reactor tube. Alternatively, other refractory foam and non-foam catalyst supports can serve as satisfactory supports for the Rh-lanthanide containing catalysts. The catalyst precursors, including Rh and lanthanide salts, with or without a ceramic support composition, may be extruded to prepare a three-dimensional form or structure such as a honeycomb, foam, other suitable tortuous-path structure, and treated as described in the following Examples. The catalyst can be structured as, or supported on, a refractory oxide "honeycomb" straight channel extrudate or monolith, made of cordierite or mullite, or other configuration having longitudinal channels or passageways permitting high space velocities with a minimal pressure drop. Such configurations are known in the art and described, for example, in *Structured Catalysts and Reactors*, A. Cybulski and J. A. Moulijn (Eds.), Marcel Dekker, Inc., 1998, p. 599–615 (Ch. 21, X. Xu and J. A. Moulijn, "Transformation of a Structured Carrier into Structured Catalyst").

Other preferred Rh—Ln catalysts are formed as granules, particles, pellets, beads, spheres, cylinders, trilobes or other manufactured shapes, or the Rh—Ln catalytic components are applied to inert refractory materials such as zirconia, α-alumina, cordierite, titania, mullite, zirconia-stabilized α-alumina, MgO stabilized zirconia, MgO stabilized alumina, and niobia, or mixtures thereof, in the form of particles, pellets, beads, spheres, trilobes, granules or the like. Preferably the support materials are pre-shaped as granules, spheres, pellets, or other geometry that provides satisfactory engineering performance, before application of the catalytic materials. A lanthanide oxide support formed into a porous refractory three-dimensional structure is a highly preferred support material for rhodium. Without wishing to be bound by any particular theory, the coke-reducing effects of the new catalyst compositions may occur due to formation of a rhodium-lanthanide alloy or solid solution. Combining a lanthanide component with rhodium changes the melting properties of the rhodium, keeping metallic rhodium in place, and also keeping the rhodium dispersed in the oxide phase. The strong interaction between rhodium and the lanthanide, made possible by the enhanced dispersion of rhodium on the lanthanide and/or the refractory support, contributes to catalyst stability. This results in a higher melting point for the catalyst and deters deactivation of the catalyst on stream. Accordingly, a "stability-enhanced" catalyst, which has been thermally conditioned during its construction, is more pressure tolerant (to at least 2 atmospheres operating pressure), high temperature resistant (up to at least 1,500° C.) and longer lived (reduced coking onstream) than a typical syngas catalyst.

The following examples are intended to illustrate but not limit the present invention.

EXAMPLES

Examples 1, 2 and 3
Rh/Sm on PSZ Monoliths

An aqueous solution of $Sm(NO_3)_3.6H_2O$ was added dropwise to saturate a PSZ monolith. Suitable PSZ monoliths about 10 or 15 mm long and 12 mm diameter are commercially available from well known sources. The monolith was situated on a Teflon® plate residing on a warm (75° C.) hotplate. The entire Sm salt solution was gradually added to the monolith, allowing the water to evaporate between saturations. The dried monolith was then calcined in air (static or flowing) according to the following program: heat from room temperature (RT) to about 125° C. at a rate of about 5° C./min, dwell at that temperature for about 60 min (extra drying step); heat from about 125° C. to about 400–900° C., preferably about 600° C., at a rate of about 1–10° C./min, preferably about 5° C./min, dwell at that temperature for about 120–360 min, or more, preferably about 240 min.

An aqueous solution of $RhCl_3.xH_2O$ was added dropwise to saturate the Sm coated PSZ monolith, prepared as described in the above paragraph. The Rh salt solution was gradually added to the monolith, allowing the water to evaporate between saturations. The dried monolith was then calcined in air flowing at about 0.1–1 NLPM (normal liters per minute), or more, but preferably about 0.4 NLPM, according to the following program: heating from room temperature (RT) to about 125° C. at a rate of increase of about 5° C./min, dwell for 60 min at about 125° C. (extra drying step); heat from about 125° C. to about 400–900° C., preferably about 600° C. at a rate of increase of about 1 to 10° C./min, preferably about 5° C./min, dwell for about 120 to 360 min, or more, preferably about 240 min at that temperature.

This final calcined Rh/Sm/PSZ monolith catalyst was then reduced in flowing $H_2$ (or $H_2/N_2$ mixture) at a flow rate of about 0.1–1 NLPM, or more, preferably about 0.6 NLPM, while applying heat according to the following program: heat from room temperature (RT) to about 125° C. at a rate of temperature increase of 5° C./min, dwell for about 30 min at that temperature (extra drying step); heat from about 125° C. to about 300 to 900° C., preferably about 400° C., at a rate of increase of about 1 to 10° C./min, preferably about 5° C./min, dwell at that temperature for about 60–360 min, or more, preferably about 180 min. The concentrations of the Sm and Rh solutions and the amounts loaded onto the PSZ monolith were chosen so as to provide the final wt % of each that is stated in Tables 1–3.

Example 4
Sm/Rh on PSZ Monolith

The order of addition of the Sm and Rh metal solutions to the PSZ monolith described above was reversed to produce a representative Sm/Rh/PSZ monolith catalyst in which the rhodium is in closest contact with the PSZ monolith and the samarium coat overlies the rhodium layer. The concentrations of the Sm and Rh solutions and the amounts loaded onto the PSZ monolith were chosen so as to provide the final wt % of each that is stated in Table 4.

Alternatively, the aqueous solution may contain salts of both Sm and Rh which are capable of decomposing when heated to form the respective metal and/or metal oxide, and the ceramic monolith is loaded in a single step, as described for the Rh solution in Example 1, to provide a satisfactory monolith catalyst for syngas production.

Although samarium was employed in the foregoing examples, it should be understood that the inventors have found that other lanthanides also perform satisfactorily. Samarium is considered by the inventors to be representative of the other lanthanide elements, including lanthanum, cerium, praseodymium, neodymium, promethium, europium, gadolinium, terbium, dysprosium, holmium, erbium, thulium and ytterbium. Accordingly, the decomposable salts of other lanthanides may be substituted in the methods described herein, and, in many cases, will provide monolith catalysts of comparable activity to the rhodium and samarium-containing exemplary catalysts for catalyzing the net partial oxidation of methane in a short-contact-time reactor to produce syngas.

Examples 5 and 6
Rh on PSZ Monolith (Comparative Examples)

An aqueous solution of $RhCl_3.xH_2O$ was added dropwise to saturate a PSZ monolith. The monolith is situated on a Teflon® plate residing on a warm (75° C.) hotplate. The entire Rh salt solution is added to the monolith over time, allowing the water to evaporate between saturations. The dried monolith is then calcined in air (flowing at 0.4 NLPM, range 0.1 to 1 or more NLPM) while applying heat according to the following program: heat from room temperature (RT) to 125° C. at a rate of temperature increase of about 5° C./min, dwell for 60 min at that temperature (extra drying step); heat from about 125° C. to about 400 to 900° C., preferably about 600° C., at a rate of increase of about 1 to 10° C./min, preferably about 5° C./min, dwell at that temperature for about 120 to 360 min., or more, preferably about 240 min. This final calcined catalyst is then reduced in flowing $H_2$ (or a $H_2/N_2$ mixture) at a flow rate of about 0.1 to 1 NLPM, or more, preferably 0.6 NLPM, according to the following program: increase the heat from room temperature (RT) to about 125° C. at a rate of increase of 5° C./min, dwell at that temperature for about 30 min (extra drying step); heat from about 300–900° C., preferably about 400° C., at a rate of increase of about 1 to 10° C./min, preferably about 5° C./min, dwell at that temperature for about 60 to 360 min., or more, preferably about 180 min.

Each of the samarium-containing monolith catalysts of Examples 1–4 and the comparative Rh/PSZ monolith catalysts of Examples 5–6 were evaluated in a reduced scale syngas production reactor, as described in the section entitled "Test Procedure." The composition and dimensions of the catalysts are summarized in Table 1 and the results of the tests on those samples are shown in Tables 2–4.

Test Procedure-1

The partial oxidation reactions were carried out in a conventional flow apparatus using a 44 mm O.D.×38 mm I.D. quartz insert embedded inside a refractory-lined steel vessel. The quartz insert contained a catalyst bed containing at least one porous monolith catalyst (~37 mm O.D.×10–15 mm high) held between two foam disks. The upper disk typically consisted of 65-ppi partially-stabilized zirconia and the bottom disk typically consisted of 30-ppi zirconia-toughened alumina. Preheating the methane or natural gas that flowed through the catalyst bed provided the heat needed to start the reaction. Oxygen was mixed with the methane or natural gas immediately before the mixture entered the catalyst bed. The methane or natural gas was spiked with propane, or another combustable gas, as needed to initiate the partial oxidation reaction, then the propane was removed as soon as the reaction initiated. Once the reaction was initiated, it proceeded autothermally. Two Type K thermocouples with ceramic sheaths were used to measure catalyst inlet and outlet temperatures. The molar ratio of $CH_4$ to $O_2$ was generally about 2:1, however the relative amounts of the gases, the catalyst inlet temperature and the reactant gas pressure could be varied by the operator according to the parameters being evaluated (see the following Tables). The product gas mixture was analyzed for $CH_4$, $O_2$, CO, $H_2$, $CO_2$ and $N_2$ using a gas chromatograph equipped with a thermal conductivity detector. A gas chromatograph equipped with a flame ionization detector analyzed the gas mixture for $CH_4$, $C_2H_6$, $C_2H_4$ and $C_2H_2$. The $CH_4$ conversion levels and the CO and $H_2$ product selectivities obtained for each catalyst monolith evaluated in this test system are considered predictive of the conversion and selectivities that will be obtained when the same catalyst is employed in a commercial scale short contact time reactor under similar conditions of reactant concentrations, temperature, reactant gas pressure and space velocity.

TABLE 1

Composition of Monolith Catalysts

| | PSZ Monolith | | | $Sm(NO_3)_3.6H_2O$ | | Sm-PSZ | $RhCl_3.xH_2O$ | |
|---|---|---|---|---|---|---|---|---|
| Ex. | Dimensions (D × L, mm) | Weight (grams) | Porosity (ppi) | Weight (grams) | Sm (wt %) | Weight (grams) | Weight (grams) | Rh (wt %) |
| 1 | 38 × 14 | 14.2351 | 80 | 2.1092 | 5.01 | 15.0968 | 1.3365 | 4.09 |
| 2 | 38/10 | 15.3349 | 80 | 2.2755 | 5.01 | 16.2987 | 1.4425 | 4.01 |
| 3a | 38/10 | 12.9296 | 80 | 1.9135 | 5.00 | 13.7263 | 1.2317 | 4.06 |
| 3b | 38/14 | 16.9431 | 80 | 2.5028 | 4.99 | 17.9945 | 1.4205 | 3.57 |
| 4 | 38/10 | 8.56 | 80 | 0.4565 | 2.05 | NM | 0.5979 | 3.48 |
| 5 | 37 × 15 | 8.5652 | 80 | NA | NA | NA | 1.0278 | 5.31 |
| 6 | 38/10 | 8.8560 | 80 | NA | NA | NA | 1.09 | 6.05 |

NA = not applicable;
NM = not measured;
D = diameter;
L = length;
ppi = pores per linear inch

TABLE 2

Comparison of Rh/Sm/PSZ Catalysts to Rh/PSZ Catalysts

| | Size | Metals Content (%) | | Pressure | Temp. | $CH_4$ | Selectivity | | GHSV |
|---|---|---|---|---|---|---|---|---|---|
| Ex. | (D × L mm) | Rh | Sm | (PSIG) | (° C.) | Conv. | CO | $H_2$ | (×$10^6$ hr$^{-1}$) |
| 1 | 38 × 14 | 4.09 | 5.01 | 45 | 1021 | 93.2 | 95.6 | 88.7 | 1.67 |
| | | | | 60 | 1048 | 91.3 | 95.0 | 89.0 | 2.09 |
| | | | | 75 | 1037 | 88.8 | 94.3 | 86.7 | 2.44 |

TABLE 2-continued

Comparison of Rh/Sm/PSZ Catalysts to Rh/PSZ Catalysts

| Ex. | Size (D × L mm) | Metals Content (%) Rh | Sm | Pressure (PSIG) | Temp. (° C.) | $CH_4$ Conv. | Selectivity CO | $H_2$ | GHSV (×10⁶ hr⁻¹) |
|---|---|---|---|---|---|---|---|---|---|
| 5 | 37 × 15 | 5.31 | | 45 | 1142 | 70.0 | 93.7 | 66.1 | 1.93 |
|   |         |      | | 60 | 1138 | 73.2 | 93.1 | 62.7 | 1.51 |
|   |         |      | | 75 | 1127 | 71.4 | 92.9 | 61.3 | 1.83 |
| 2 | 38 × 10 | 4.01 | 5.01 | 25 | 1135 | 82 | 91.4 | 87.5 | 1.57 |
|   |         |      |      | 60 | 1150 | 79 | 89.7 | 79.8 | 2.74 |
|   |         |      |      | 75 | 1150 | 78 | 88.2 | 77.2 | 3.23 |
| 6 | 38 × 10 | 6.05 | | 45 | 1160 | 70.6 | 93.3 | 72.9 | 1.86 |
|   |         |      | | 60 | 1153 | 73.3 | 93.1 | 70.8 | 2.56 |
|   |         |      | | 75 | 1158 | 72.9 | 93.0 | 71.1 | 2.95 |

GHSV = gas hourly space velocity

TABLE 3

Catalytic Activity of a Combined Rh/Sm/PSZ Stack

| Ex. 3 | Size (d × l mm) | Metals Content (%) Rh | Sm | Pressure (PSIG) | Temp. (° C.) | $CH_4$ Conv. | Selectivity CO | $H_2$ | GHSV × 10⁶ |
|---|---|---|---|---|---|---|---|---|---|
| 3a | 38 × 10 | 4.06 | 5.00 | 25 | 946 | 93.0 | 94.5 | 87.3 | 0.69 |
| 3b | 38 × 14 | 3.57 | 4.99 | 45 | 990 | 91.4 | 94.9 | 87.8 | 1.02 |
|    |         |      |      | 60 | 1009 | 90.4 | 94.8 | 87.6 | 1.17 |
|    |         |      |      | 75 | 1045 | 90.5 | 94.4 | 85.1 | 1.45 |
|    |         |      |      | 90 | NR | 91.6 | 95.1 | 85.0 | 1.73 |
|    |         |      |      | 105 | NR | 91.4 | 95.0 | 84.9 | 1.88 |

Note:
NR = Not reported

TABLE 4

Catalytic Activity of Sm/Rh/PSZ

| Ex. | Size (d × l mm) | Metals Content (%) Rh | Sm | Pressure (PSIG) | Temp. (° C.) | $CH_4$ Conv. | Selectivity CO | $H_2$ | GHSV × 10⁶ |
|---|---|---|---|---|---|---|---|---|---|
| 4 | 38 × 10 | 3.48 | 2.05 | 45 | 1009 | 84.8 | 93.6 | 85.8 | 3.81 |
|   |         |      |      | 60 | 1009 | 85 | 93.3 | 86.0 | 5.20 |
|   |         |      |      | 75 | 1139 | 84.7 | 93.2 | 85.5 | 6.03 |

From the comparative data shown in Table 2, it can be seen that the overall level of $CH_4$ conversion is about 17 to 23% higher for the ⅝ inch (15 mm×12 mm) Rh/Sm/PSZ catalyst of Example 1 vs. the Rh/PSZ catalyst of Example 5, despite having 25% more Rh on the latter catalyst. The observed CO selectivity is approximately 2% higher for Rh/Sm-PSZ, and the $H_2$ selectivity is 20 to 25% higher for Rh/Sm-PSZ. The catalyst temperature is lower for Rh/Sm-PSZ.

Comparing the catalytic activity of the shorter (i.e., ⅜ inch; about 10 mm×12 mm) Rh/Sm/PSZ monolith catalyst of Example 2 to a similar length Rh/PSZ monolith catalyst (Example 6), it can be seen in Table 2 that the overall $CH_4$ conversion is approximately from 5 to 12% higher for Rh/Sm-PSZ vs. Rh/PSZ, despite having 50% more Rh on the latter catalyst. CO selectivity is approximately 2 to 5% lower for the Rh/Sm-PSZ catalyst. $H_2$ selectivity is 6 to 15% higher for Rh/Sm-PSZ. The catalyst temperature is similar for both catalysts.

Table 3 shows the effect of length on the reaction using two stacked monoliths. The catalyst of Example 3 is a combination of two separate 12 mm diameter Rh/Sm/PSZ monoliths about ⅜" and ⅝" (10 mm (3a) and about 15 mm long (3b) which were stacked in the reactor tube.

An overall catalyst bed length of about 15/16" (24 mm) was obtained. When this combination catalyst bed was evaluated in the test reactor, it was observed that the additional monolith length provided some unexpected advantages in the net partial oxidation of methane to syngas. In this case, the overall $CH_4$ conversion was consistently high (i.e., more than 91%) over wide range of pressures (25 to 105 psig), compared to the value obtained for either the 10 mm or 15 mm Rh/Sm/PSZ monolith of Examples 1 or 2 (Table 2). CO selectivity was also approximately 2% higher. $H_2$ selectivity was 20 to 25% higher for the longer Rh/Sm/PSZ catalyst bed, and the catalyst temperature was lower for the catalyst monolith of Example 3. The graph in FIG. 1 shows the higher methane conversion levels obtained with a 15/16" or a ⅝" monolith catalyst than with a shorter (⅜") monolith catalyst when evaluated at reactant gas pressures of 20, 40, 60, 75 and 90 psig. Even after correcting the data for the greater total amount of Sm and Rh contained in the 15 mm and the 24 mm beds, the conversion level is significantly higher for the longer monoliths, as demonstrated in FIG. 2. This data suggests that improved performance synthesis gas catalysts are obtained by preparing longer monolith catalysts, at least for syngas production in the reduced scale reactors.

Figure 2:
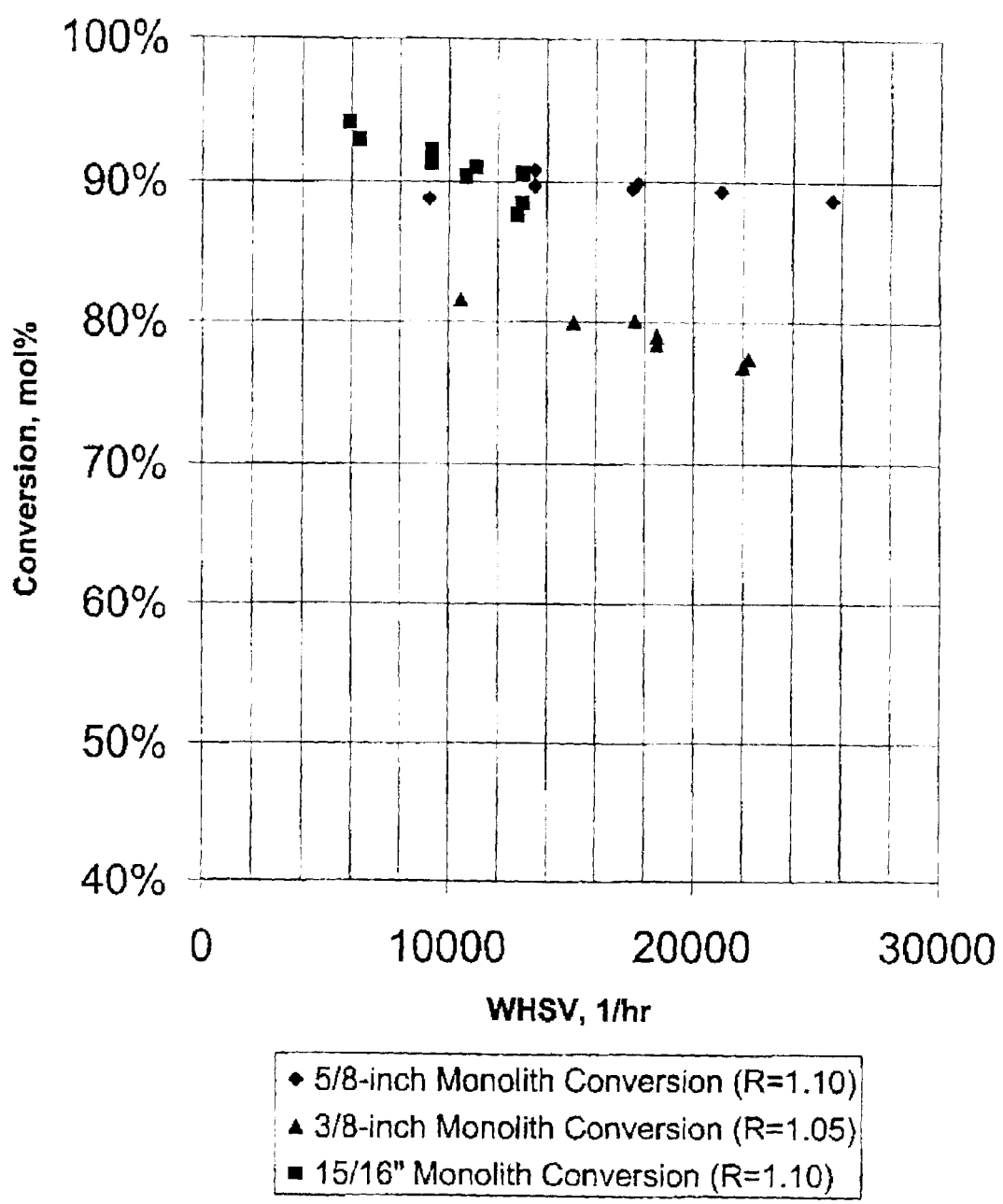
FIG. 2 is a graph showing the carbon conversion activities of the catalyst of FIG. 1 at various weight hourly space velocities (grams $CH_4$/grams catalyst/hr.).

FIG. 2 is a graph of the same data as in FIG. 1, except that it presents the carbon conversion activity of each monolith catalyst relative to the corresponding weight hourly space velocity. Weight hourly space velocities (WHSV) ranged from about 6000 to 26,000 grams $CH_4$ fed to the reactor per gram of monolith catalyst per hour. In these tests the ratio of $CH_4:O_2$ in the reactant gas mixture was adjusted slightly for the 5/8" and the 15/16" monoliths (i.e., from R=1.05 for the 3/8" monolith to R=1.10 for the 3/8" and 15/16" monoliths, where R is the ratio of oxygen to natural gas, by mass), in order to keep the run temperature in each case at no more than 1,150° C.

Table 4 shows the effects that reversing the order of metal addition to the PSZ monolith has on $CH_4$ conversion, product selectivity and run temperature. The monolith catalyst of Example 4 was prepared by first loading Rh on the PSZ monolith, followed by Sm. Note that $CH_4$ conversion and selectivities are high for both CO and $H_2$. Also, the catalyst bed runs at a lower temperature compared to the monolith loaded with only Rh (Comparative Example 6) or the corresponding Rh/Sm/PSZ monolith catalyst of Example 2.

Examples 7–9
Rh/Sm on PSZ Monolith 0.4734 g $Sm(NO_3)_3.6H_2O$ (Aldrich) was dissolved in sufficient water to form an aqueous solution. A PSZ monolith about 15 mm long and 12 mm diameter was situated on a Teflon® plate resting on a warm (75° C.) hotplate. Satisfactory PSZ monoliths can be obtained commercially (Vesuvius Hi-Tech Ceramics, NY or Porvair Advanced Materials Inc., NC). The entire Sm salt solution was gradually added to the monolith, allowing the water to evaporate between saturations. The dried monolith was then calcined in air (static or flowing) according to the following program: heat from room temperature (RT) to about 125° C. at a rate of about 3° C./min, dwell at that temperature for about 60 min; heat from about 125° C. to about 400–900° C. preferably about 500° C., at a rate of about 1–10° C./min, preferably about 5° C./min, dwell at that temperature for about 120–360 min, or more, preferably about 180 min.

An aqueous solution of $RhCl_3.xH_2O$ was added dropwise to saturate the Sm-coated PSZ monolith, prepared as described in the above paragraph. The Rh salt solution was gradually added to the monolith, allowing the water to evaporate between saturations. The dried monolith was then calcined in air, according to the program described above.

This final calcined Rh/Sm/PSZ catalyst system was then reduced in flowing $H_2$ (or $H_2/N_2$ mixture) at a flow rate of about 0.1–1 NLPM, or more, preferably about 0.6 NLPM, while applying heat according to the following program: heat from room temperature (RT) to about 125° C. at a rate of temperature increase of 3° C./min, dwell for about 30 min at that temperature; heat from about 125° C. to about 300 to 900° C., preferably about 500° C., at a rate of increase of about 1 to 10° C./min, preferably about 3° C./min, dwell at that temperature for about 60–360 min, or more, preferably about 180 min. The concentrations of the Sm and Rh solutions and the amounts loaded onto the PSZ monolith were chosen so as to provide the final wt % of each metal stated in Table 5.

Example 10
Rh/Yb on PSZ Monolith

Rh/Yb/PSZ was prepared according to the procedure used for Examples 7–9, using aqueous solutions of $Yb(NO_3)_3$ and $RhCl_3$.

Example 11
Rh/Pr on PSZ Monolith

Rh/Pr/PSZ was prepared according to the procedure used for Examples 7–9, using aqueous solutions of $Pr(NO_3)_3$ and $RhCl_3$.

Each of the catalysts of Examples 7–11 was evaluated in a reduced scale syngas production reactor as described in the section entitled "Test Procedure-2." The composition and dimensions of the catalysts are summarized in Table 5 and the results of the tests on those samples are shown in Table 6.

Test Procedure-2

The catalysts were evaluated for their ability to catalyze the partial oxidation reaction in a conventional flow apparatus using a quartz reactor with a length of 12 inches, an outside diameter of 19 mm and an inside diameter of 13 mm. Ceramic foam pieces of 99% $Al_2O_3$ (12 mm outside diameter×5 mm thick, with 45 pores per linear inch) were placed before and after the catalyst as radiation shields. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

In addition to the thermocouples placed above and below the catalyst, the reactor also contained two axially positioned, triple-point thermocouples, one before and another after the catalyst. These triple-point thermocouples were used to determine the temperature profiles of the reactants and products that were subjected to preheating and quenching, respectively.

The runs were conducted at a $CH_4:O_2$ molar ratio of 1.75:1–2:1 with a combined flow rate of about 3.8–7.7 SLPM (standard liters per minute), corresponding to a gas hourly space velocity of 192,300–384,600 $hr^{-1}$ and at a pressure of 5 psig (136 kPa). The reactor effluent was analyzed using a gas chromatograph equipped with a thermal conductivity detector. The data reported in Tables 6 and 8 are obtained after at least 6 hours on stream at the specified conditions.

TABLE 5

Composition of Catalysts

| Ex. | Dimensions (D × L, mm) | Support | Porosity (ppi) | Lanthanide (wt %) | Rh (wt %) |
|---|---|---|---|---|---|
| 7 | 12 × 15 | PSZ (Mg) | 80 | 5% Sm | 2% |
| 8 | 12 × 15 | PSZ (Mg) | 80 | 5% Sm | 3% |
| 9 | 12 × 15 | PSZ (Mg) | 80 | 5% Sm | 4% |

TABLE 5-continued

Composition of Catalysts

| Ex. | Dimensions (D × L, mm) | Support | Porosity (ppi) | Lanthanide (wt %) | Rh (wt %) |
|---|---|---|---|---|---|
| 10 | 12 × 15 | PSZ (Mg) | 80 | 5% Yb | 4% |
| 11 | 12 × 15 | PSZ (Mg) | 80 | 5% Pr | 4% |

D = diameter;
L = length;
PSZ (Mg) denotes that the zirconia is partially stabilized with Mg;
ppi = pores per linear inch;
wt % = nominal wt %

TABLE 6

Performance Data for Rh/Lanthanide Catalysts

| Ex. | Metals Content (%) Rh | Ln | $CH_4:O_2$ ratio | Flow rate (SLPM) | GHSV ($hr^{-1}$) | Temp. (° C.) | $CH_4$ Conv. | Selectivity (%) CO | $H_2$ |
|---|---|---|---|---|---|---|---|---|---|
| 7 | 2 | 5 (Sm) | 1.75:1 | 3.868 | 192,300 | 806 | 93.9 | 94.8 | 91.8 |
|   |   |   | 1.75:1 | 7.873 | 391,400 | 822 | 93.0 | 95.3 | 91.0 |
| 8 | 3 | 5 (Sm) | 1.75:1 | 3.870 | 192,400 | 765 | 93.6 | 95.3 | 90.7 |
|   |   |   | 1.75:1 | 7.864 | 391,000 | 819 | 94.4 | 96.6 | 90.3 |
| 9 | 4 | 5 (Sm) | 1.75:1 | 3.870 | 192,400 | 810 | 96.6 | 96.3 | 91.6 |
|   |   |   | 1.75:1 | 7.716 | 383,600 | 825 | 95.5 | 96.7 | 91.1 |
| 10 | 4 | 5 (Yb) | 1.75:1 | 3.866 | 192,200 | 760 | 93.9 | 94.9 | 91.5 |
|   |   |   | 1.75:1 | 7.866 | 391,100 | 760 | 94.9 | 95.6 | 91.7 |
| 11 | 4 | 5 (Pr) | 1.75:1 | 3.87 | 192,400 | 751 | 93.6 | 95.0 | 91.1 |
|   |   |   | 1.75:1 | 7.876 | 391,600 | 798 | 94.6 | 95.6 | 91.4 |

Example 12
Rh/Sm on PSZ Monolith

Sm was added first to the support, followed by the addition of Rh using the sequential impregnation procedure described above. The catalyst was dried and calcined using the conditions described for Examples 7–9.

Example 13
Rh-Sm on PSZ Monolith

Both Rh and Sm were added simultaneously using the co-impregnation procedure, by mixing the Rh and Sm-containing solutions and then adding to the PSZ monolith, using the conditions described above.

Example 14
Rh/Sm on $ZrO_2$ Granules (a.) Rh/Sm catalyst was prepared on $ZrO_2$ granules of 35–50 mesh size (0.3 mm to 0.5 mm). Satisfactory ZrO2 granules can be obtained commercially (Sud-Chemie, Louisville, Ky.). The synthesis procedure is as described for Examples 7–9, except the Sm and Rh precursor solutions were added to the support granules in a crucible, followed by drying on the hotplate at about 75° C. for 2 hours with frequent mixing, followed by calcination at the same conditions as for Examples 7–9. Sm was coated first, followed by Rh, using the sequential impregnation method. The final catalyst was obtained after reduction at the conditions described for Examples 7–9 to provide a catalyst containing 5.8% Rh and 4.1% Sm on $ZrO_2$ granules.

(b.) Alternatively, the following procedure was followed: 0.4734 g $Sm(NO_3)_3.5H_2O$ (Aldrich) was dissolved in sufficient water to form an aqueous solution. The $ZrO_2$ granules were immersed into the solution for wet impregnation, then allowed to dry on a hotplate. The impregnated granules were calcined in air according to the following schedule: 5° C./min ramp to 325° C., hold at 325° C. for 1 h, 5° C./min ramp to 700° C., hold at 700° C. for 2 h, cool down to room temperature. 0.5839 g $RhCl_3.xH_2O$ (Aldrich) was dissolved in sufficient water to form an aqueous solution. The calcined Sm-containing granules were immersed into the rhodium solution for wet impregnation, then allowed to dry on a hotplate. The Rh impregnated granules were then calcined in air according to the following schedule: 5° C./min ramp to 325° C., hold at 325° C. for 1 h, 5° C./min ramp to 700° C., hold at 700° C. for 2 h, cool down to room temperature. This material was then reduced at 500° C. for 3 h under a stream of 300 mL/min $H_2$ and 300 mL/min $N_2$ to provide a catalyst containing 6% Rh and 5% Sm supported on $ZrO_2$ granules.

(c.) A similar procedure was employed to yield a catalyst with a final loading of 4.52% Rh and 4.13% Sm (in the form of $Sm_2O_3$) supported on 35–50 mesh $ZrO_2$ granules. Instead of using zirconia granules or spheres, the support could be MgO modified zirconia, MgO, alpha-alumina, titania, niobia, silica, or a wide range of other materials that are capable of serving as a refractory support. The granule or spheres range in size from 50 microns to 6 mm in diameter (i.e., about 120 mesh, or even smaller, to about ¼ inch). Preferably the particles are no more than 3 mm in their longest characteristic dimension, or range from about 80 mesh (0.18 millimeters) to about ⅛ inch, and more preferably about 35–50 mesh. The term "mesh" refers to a standard sieve opening in a screen through which the material will pass, as described in the Tyler Standard Screen Scale (C. J. Geankoplis, TRANSPORT PROCESSES AND UNIT OPERATIONS, Allyn and Bacon, Inc., Boston, Mass., p. 837), hereby incorporated herein by reference. Preferably the support materials are pre-shaped as granules, spheres, pellets, or other geometry that provides satisfactory engineering performance, before application of the catalytic materials.

It is preferred that the BET surface area of the blank (unimpregnated) granules is higher than that of a corresponding monolith. The BET surface area of blank 35–50 mesh $ZrO_2$ granules is about 35 $m^2/g$, and that of a blank (80 ppi) PSZ monolith is about 0.609 $m^2/g$. With similar active catalyst material loading, granule supported catalysts have higher metal dispersion than corresponding monolith catalysts, as shown for representative catalysts in Table 7. The metal surface area of the catalyst is determined by measuring the dissociation of $H_2$ on the surface of the metal. A Micromeritics ASAP 2010 automatic analyzer system is used, employing $H_2$ as a probe molecule. The ASAP 2010 system uses a flowing gas technique for sample preparation to ensure complete reduction of reducible oxides on the surface of the sample. A gas such as hydrogen flows through the heated sample bed, reducing the oxides on the sample (such as platinum oxide) to the active metal (pure platinum). Since only the active metal phase responds to the chemisorbate (hydrogen in the present case), it is possible to measure the active surface area and metal dispersion independently of the substrate or inactive components. The analyzer uses the static volumetric technique to attain precise dosing of the chemisorbate and rigorously equilibrates the sample. The first analysis measures both strong and weak sorption data in combination. A repeat analysis measures only the weak (reversible) uptake of the probe molecule by the sample supports and the active metal. As many as 1000 data points can be collected with each point being fully equilibrated.

Prior to the measurement of the metal surface area the sample is pre-treated. The first step is to pretreat the sample in He for 1 hr at 100° C. The sample is then heated to 350° C. in He for 1 hr. These steps clean the surface prior to measurement.

Next the sample is evacuated to sub-atmospheric pressure to remove all previously adsorbed or chemisorbed species. The sample is then oxidized in a 10% oxygen/helium gas at 350° C. for 30 minutes to remove any possible organics that are on the surface.

The sample is then reduced at 500° C. for 3 hours in pure hydrogen gas. This reduces any reducible metal oxide to the active metal phase. The sample is then evacuated using a vacuum pump at 450° C. for 2 hours. The sample is then cooled to 35° C. prior to the measurement. The sample is then ready for measurement of the metal surface.

From the measurement of the volume of $H_2$ uptake during the measurement step, it is possible to determine the metal surface area per gram of catalyst structure by the following equation.

$$MSA = (V)(A)(S)(a)/22400/m$$

where MSA is the metal surface are in $m^2$/gram of catalyst structure;

V is the volume of adsorbed gas at Standard Temperature and Pressure in ml.;

A is the Avogadro constant;

S is the stoichiometric factor (2 for $H_2$ chemisorption);

m is the sample weight in grams; and a is the metal cross sectional area.

As shown in Table 7, in which the metal in the equation is rhodium, the lanthanide content helps to increase metal dispersion on a given support.

TABLE 7

Dispersion of Active Material on the Support

| Type of Support | 3-D Monolith | Granules | Granules |
|---|---|---|---|
| Catalyst Composition | 6.5% Rh/ 4.53% Sm on 80 ppi PSZ | 5.42% Rh/ 3.73% Sm on 35–50 mesh $ZrO_2$ | 4.98% Rh on 35–50 mesh $ZrO_2$ |
| Metal dispersion - rhodium | 9.0% | 15.1% | 3.6% |
| Metal Surface Area - Sample ($m_2$/g catalyst structure) | 2.43 $m^2$/g | 3.3 $m^2$/g | 0.71 $m^2$/g |

TABLE 7-continued

Dispersion of Active Material on the Support

| Type of Support | 3-D Monolith | Granules | Granules |
|---|---|---|---|
| Metal Surface Area - ($m^2$/g metal) | 39.8 $m^2$/g | 66.5 $m^2$/g | 15.38 $m^2$/g |

Example 15

Rh on $ZrO_2$ Granules

A catalyst containing 6% Rh loaded on 35–50 mesh $ZrO_2$ granules was prepared as described in Example 14b, except that Sm was omitted. A 0.4 mL sample was evaluated in a pilot-scale syngas production reactor as described in Test Procedure-3, below.

Example 16

6.12% Rh/4.5% Sm on Alumina Granules

A catalyst containing 6.12% Rh loaded on 35–50 mesh alumina granules was prepared as described in Example 14b, except that alumina granules were substituted for the zirconia granules. A 1.2 mL sample was evaluated in a pilot-scale syngas production reactor as described in Test Procedure-2, above.

Catalysts 12–14 and 16 were evaluated using Test Procedure-2. The composition and dimensions of catalysts 12–16 are summarized in Table 8 and the results of the tests on those samples are shown in Table 9.

Test Procedure-3

The partial oxidation reactions were carried out in a conventional flow apparatus using a 19 mm O.D.×13 mm I.D. quartz insert embedded inside a refractory-lined steel vessel. The quartz insert contained a catalyst system containing at least one porous monolith catalyst (about 12 mm O.D.×15 mm high) held between two foam disks. In the case of the granule-supported catalysts (Ex. 14), the catalyst was packed between the two foam disks. The upper disk typically consisted of 65-ppi PSZ and the bottom disk typically consisted of 30-ppi zirconia-toughened alumina. Preheating the methane or natural gas that flowed through the catalyst system provided the heat needed to start the reaction. Oxygen was mixed with the methane or natural gas immediately before the mixture entered the catalyst system. The methane or natural gas was spiked with propane as needed to initiate the partial oxidation reaction, then the propane was removed as soon as the reaction commenced. Once the partial oxidation reaction commenced, the reaction proceeded autothermally. Two Type K thermocouples with ceramic sheaths were used to measure catalyst inlet and outlet temperatures. The molar ratio of $CH_4$ to $O_2$ was generally about 2:1, however the relative amounts of the gases, the catalyst inlet temperature and the reactant gas pressure could be varied by the operator according to the parameters being evaluated (see Table 9). The product gas mixture was analyzed for $CH_4$, $O_2$, CO, $H_2$, $CO_2$ and $N_2$ using a gas chromatograph equipped with a thermal conductivity detector. A gas chromatograph equipped with flame ionization detector analyzed the gas mixture for $CH_4$, $C_2H_6$, $C_2H_4$ and $C_2H_2$. The $CH_4$ conversion levels and the CO and $H_2$ product selectivities obtained for each catalyst evaluated in this test system are considered predictive of the conversion and selectivities that will be obtained when the same catalyst is employed in a commercial scale short contact time reactor under similar conditions of reactant concentrations, temperature, reactant gas pressure and space velocity.

TABLE 8

Composition of Catalysts

| Ex. | Dimensions (D × L, mm) | Support | Monolith Porosity (ppi) | Lanthanide (wt %) | Rh (wt %) |
|---|---|---|---|---|---|
| 12 | 12 × 15 | PSZ (Mg) | 80 | 4.0% Sm | 6.2% |
| 13 | 12 × 15 | PSZ (Mg) | 80 | 5.3% Sm | 4.9% |
| 14 | 35–50 mesh 1.2 mL | $ZrO_2$ | N/A | (a) 4.1% Sm<br>(b) 5% Sm<br>(c) 4.13% Sm | 5.8%<br>6%<br>4.52% |
| 15 | 35–50 mesh .4 mL | $ZrO_2$ | N/A | — | 6% |
| 16 | 35–50 mesh 1.2 mL | $Al_2O_3$ | N/A | 4.5% Sm | 6.12% |

D = diameter;
L = length;
PSZ (Mg) denotes that the zirconia is partially stabilized with Mg;
ppi = pores per linear inch

TABLE 9

Performance Data for Rh/Lanthanide Catalysts

| Ex. | Metals Content (%) Rh | Metals Content (%) Ln | NG:$O_2$ ratio | Pressure (psig) | GHSV ($hr^{-1}$) | Temp. (° C.) | $CH_4$ Conv. | Selectivity CO | Selectivity $H_2$ |
|---|---|---|---|---|---|---|---|---|---|
| 12 | 6.2 | 4.0 (Sm) | 1.82:1 | 45 | 1,014,000 | 983 | 89.6 | 96.2 | 91.2 |
| 13 | 4.9 | 5.3 (Sm) | 1.73:1 | 45 | 1,280,000 | 1161 | 79.6 | 88.8 | 74.8 |
|    |     |     | 1.81:1 | 90 | 1,065,000 | 1156 | 75.6 | 88.3 | 74.5 |
| 14a | 5.8 | 4.1 (Sm) | 1.70:1 | 45 | 2,118,000 | 1033 | 90.9 | 95.8 | 89.5 |
| 14b | 4.52 | 4.13 (Sm) | 1.69:1 | 90 | 1,803,000 | 1050 | 89.1 | 94.8 | 88.9 |
|     |      |      | 1.82:1 | 90 | 1,612,000 | 944 | 95 | 95 | 95 |
|     |      |      | 1.82:1 | 125 | 2,253,000 | 984 | 95 | 96 | 92 |
| 15 | 6 | — | 2:1 | 5.5 | 1,162,050 | 728 | 80 | 96 | 80 |
|    |   |   |     |     | 1,162,050 | 771 | 85 | 98 | 85 |
|    |   |   |     |     | 584,250 | 711 | 88 | 98 | 88 |
|    |   |   |     |     | 814,950 | 729 | 86 | 98 | 85 |
| 16 | 6.12 | 4.5 (Sm) | 1.90:1 | 90 | 2,203,958 | 951 | 91 | 96 | 90 |

In Ex. 14, 1.4 grams of Rh/Sm/$ZrO_2$ granules was used for the test.
In Ex. 15, 0.4 mL (i.e., bed length about ⅛ inch, bed diameter about ½ inch) was used for the tests.
Ln = lanthanide
n/a = data not available From the data shown in Table 6, as a function of the Rh loading (Examples 7–9), it can be seen that the $CH_4$ conversion and CO and $H_2$ selectivities are all in the 90+% levels, even as the Rh loading was decreased from 4% to 2%, indicating that the lanthanide promoted catalyst system requires smaller Rh loading to achieve superior performance for syngas generation. The presence of the lanthanide promoter in the supported catalyst facilitates light-off of the reaction and these catalysts tend to run at much lower temperatures than conventional rhodium catalysts. From the comparative data shown in Table 6 (Examples 9–11), it can be seen that for Sm, Yb and Pr-promoted Rh catalysts, $CH_4$ conversion and CO and $H_2$ selectivities are all in the 90+% range, and are not affected when the space velocities are increased from 190,000 $hr^{-1}$ to 390,000 $hr^{-1}$, indicating the stable performance of these catalyst systems at short contact time conditions.

As shown in Table 9, comparing the catalytic activity of the Rh/Sm/PSZ monolith catalyst (Example 12) to a similar composition supported on zirconia granular support (Example 14a), it can be seen that for the approximately 5.8% Rh/4.1% Sm loaded catalyst, the $CH_4$ conversion and CO and $H_2$ selectivities are about the same, despite doubling the space velocity on the latter catalyst. This stable performance is believed to be a result of higher active site density and better heat transfer in the case of the particulate support form. An increase in reactant gas pressure from 45 psig to 90 psig (Example 13 and Example 14a) does not make a significant difference in the $CH_4$ conversion and CO and $H_2$ selectivities, again confirming the efficiency of the new catalyst systems under short contact time operation.

Figure 3:
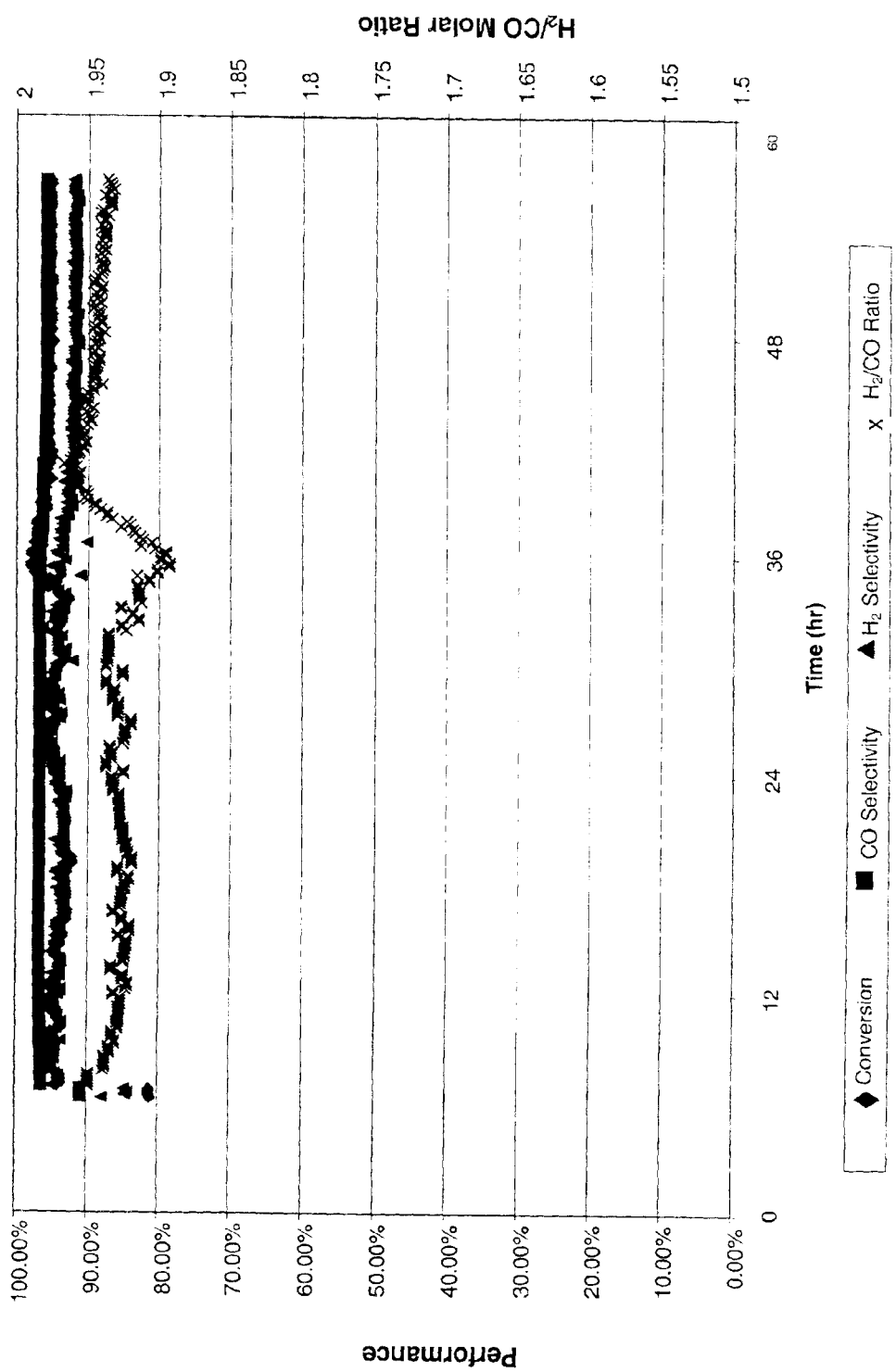
FIG. 3 is a graph showing catalyst performance over a two-day syngas production run for one catalyst containing 4.52 wt % Rh and 4.13 wt % $Sm_2O_3$ supported on $ZrO_2$ granules of size 35–50 mesh.
Figure 4:
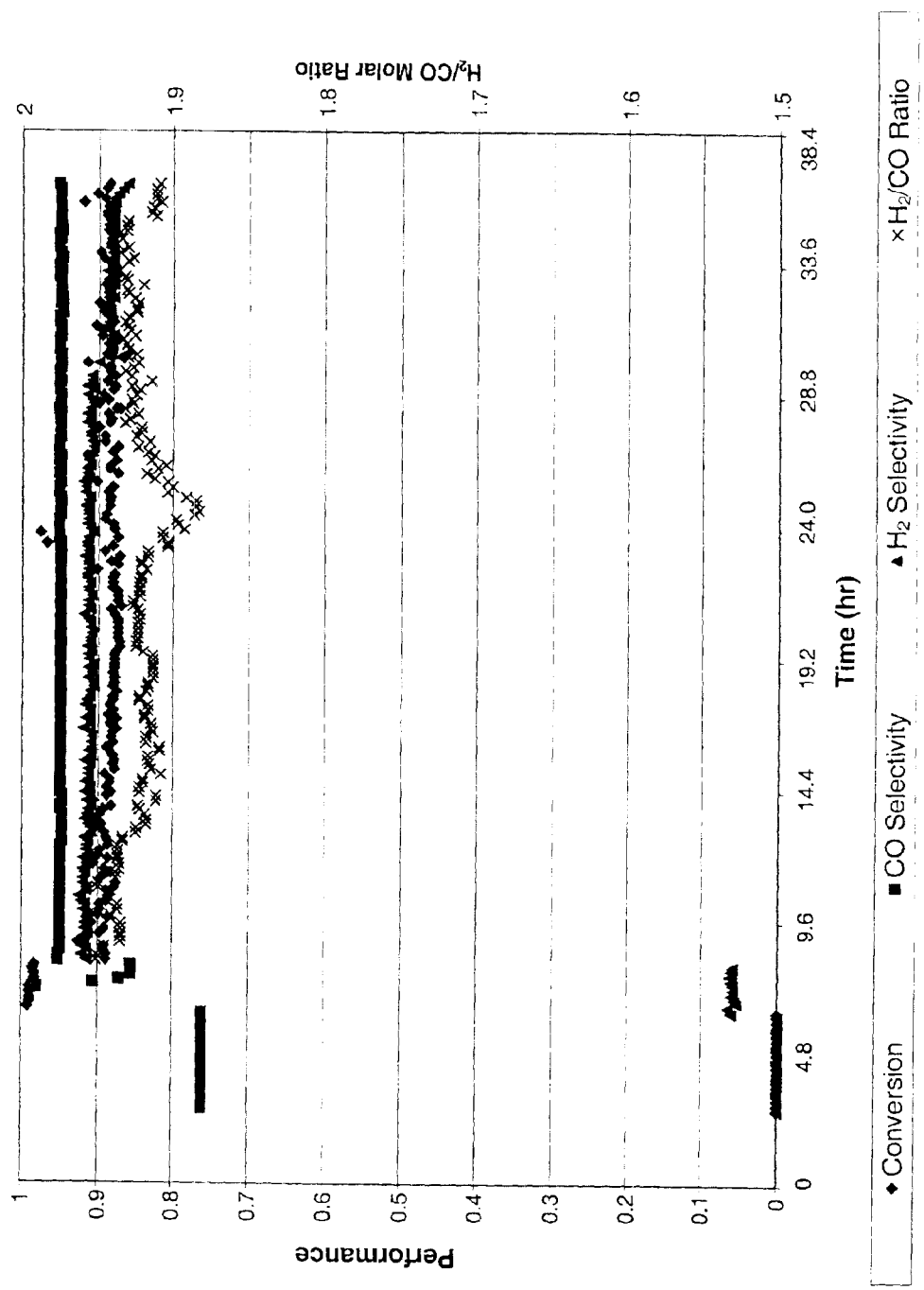
FIG. 4 is a graph showing catalyst performance over a two-day syngas production run for a catalyst similar to the one used in FIG. 3.
Figure 5:
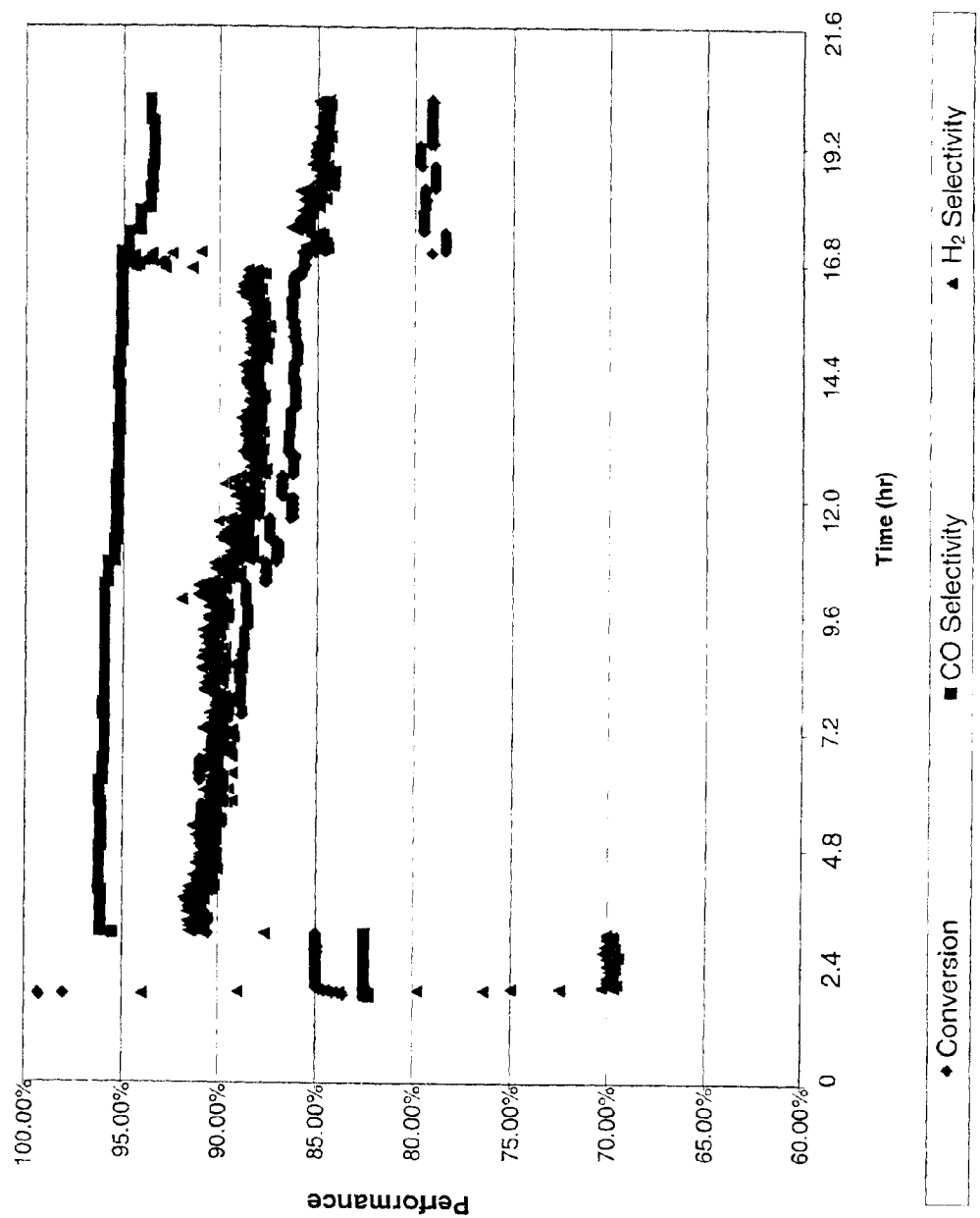
FIG. 5 is a graph showing catalyst performance over an approximately 24 hr syngas production run for one catalyst containing 6% Rh and 4% Sm supported on an 80 ppi PSZ monolith under similar process conditions to those employed in FIGS. 3 and 4.

Repeated tests of the 4.52% Rh/4.13% Sm loaded $ZrO_2$ granules (Example 14c) yielded significantly better performance than a similar PSZ monolith-supported catalyst, as shown in the performance graphs presented as FIGS. 3—5. FIG. 3 is a graph showing catalyst performance over a two-day syngas production run for the composition 4.52 wt % Rh and 4.13 wt % $Sm_2O_3$ supported on 35–50 mesh $ZrO_2$ granules (Example 14(c)). In this test, the pressure changed from 45 to 90 to 125 psig over the approximately 60 hr period. During the final approximately 20 hours the run conditions were 125 psig, 1,000° C. and 2.25×10⁶ $hr^{-1}$ gas hourly space velocity. FIG. 4 is a graph showing catalyst performance over a two-day syngas production run for a similar catalyst. The run conditions were 45 and 90 psig. For the last approximately 10 hrs the conditions were 90 psig, 1,080° C. and 0.969×10⁶ $hr^{-1}$. FIG. 5 is a graph showing catalyst performance over an approximately 24 hr syngas production run for a catalyst containing 6% Rh and 4% Sm supported on an 80 ppi PSZ monolith. Over the course of this test the pressure changed from 45 to 60 and then to 90 psig, with temperatures of 997° C., 1,080° C. and 1,152° C., respectively. The respective flow rates (gas hourly space velocity) were 1.041×10⁶ $hr^{-1}$, 1.280×10⁶ $hr^{-1}$ and 1.821×10⁶ $hr^{-1}$.

Figure 6A:
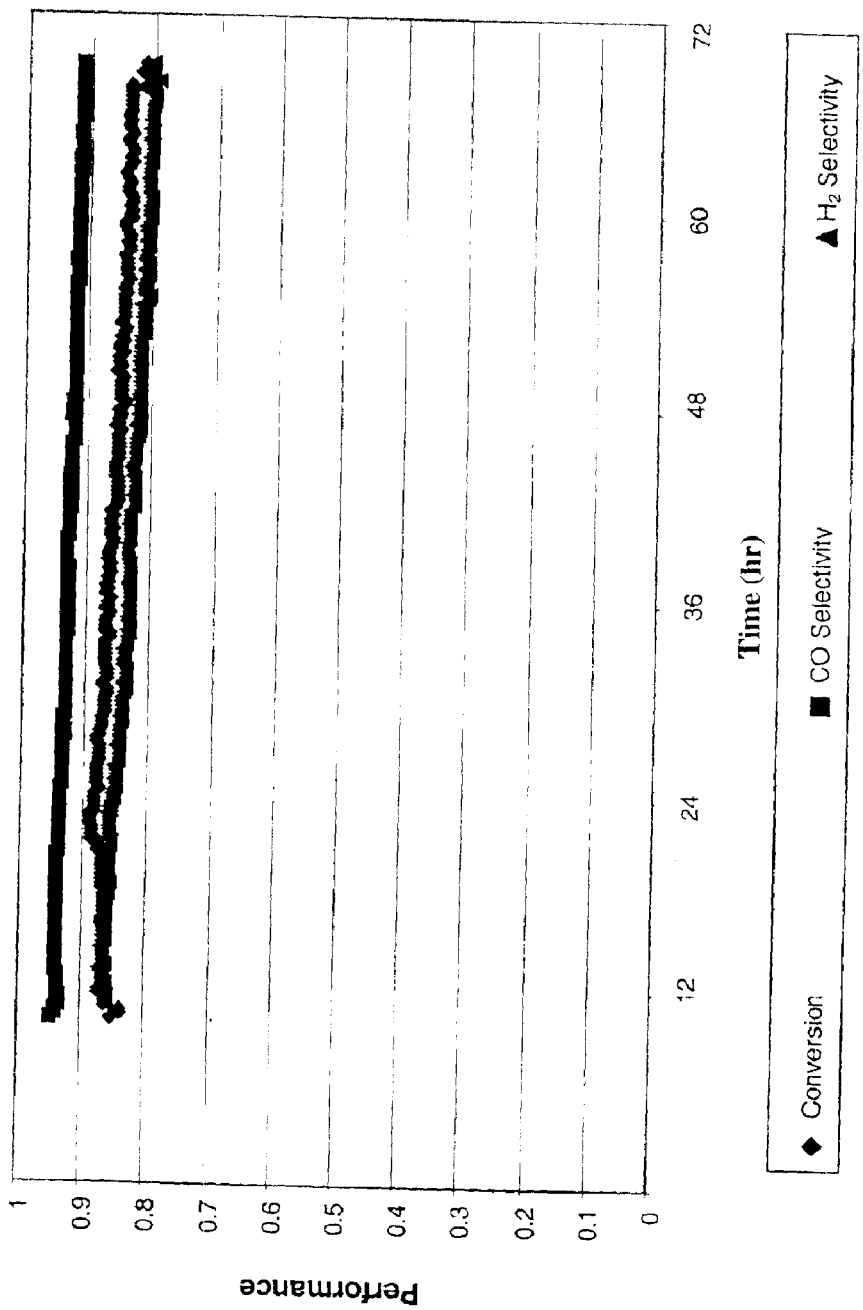
FIGS. 6A and 6B are performance graphs for different lots of catalyst containing 6% Rh and 4% Sm supported on 35–50 mesh zirconia granules.
Figure 6B:
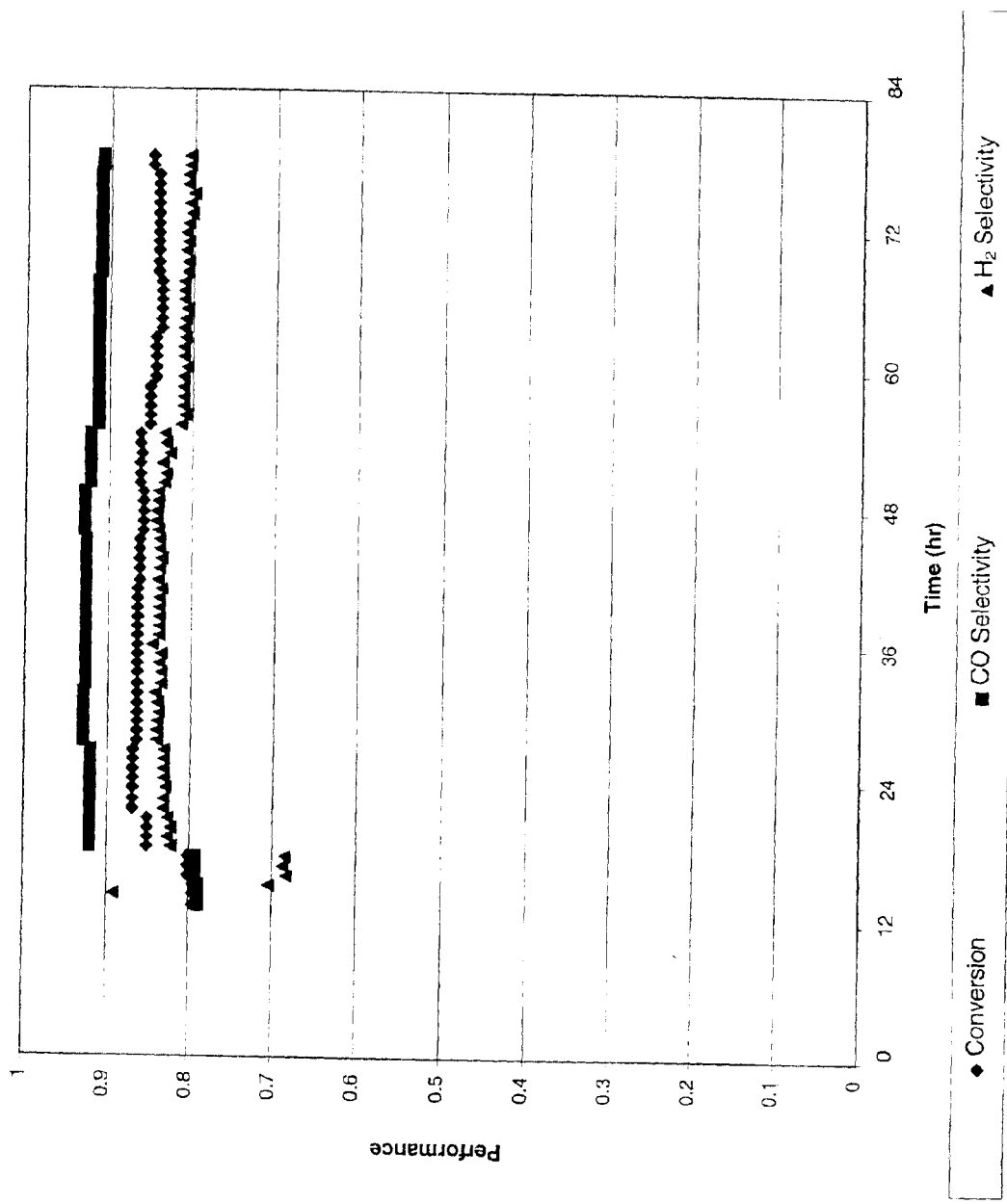
Figure 7:
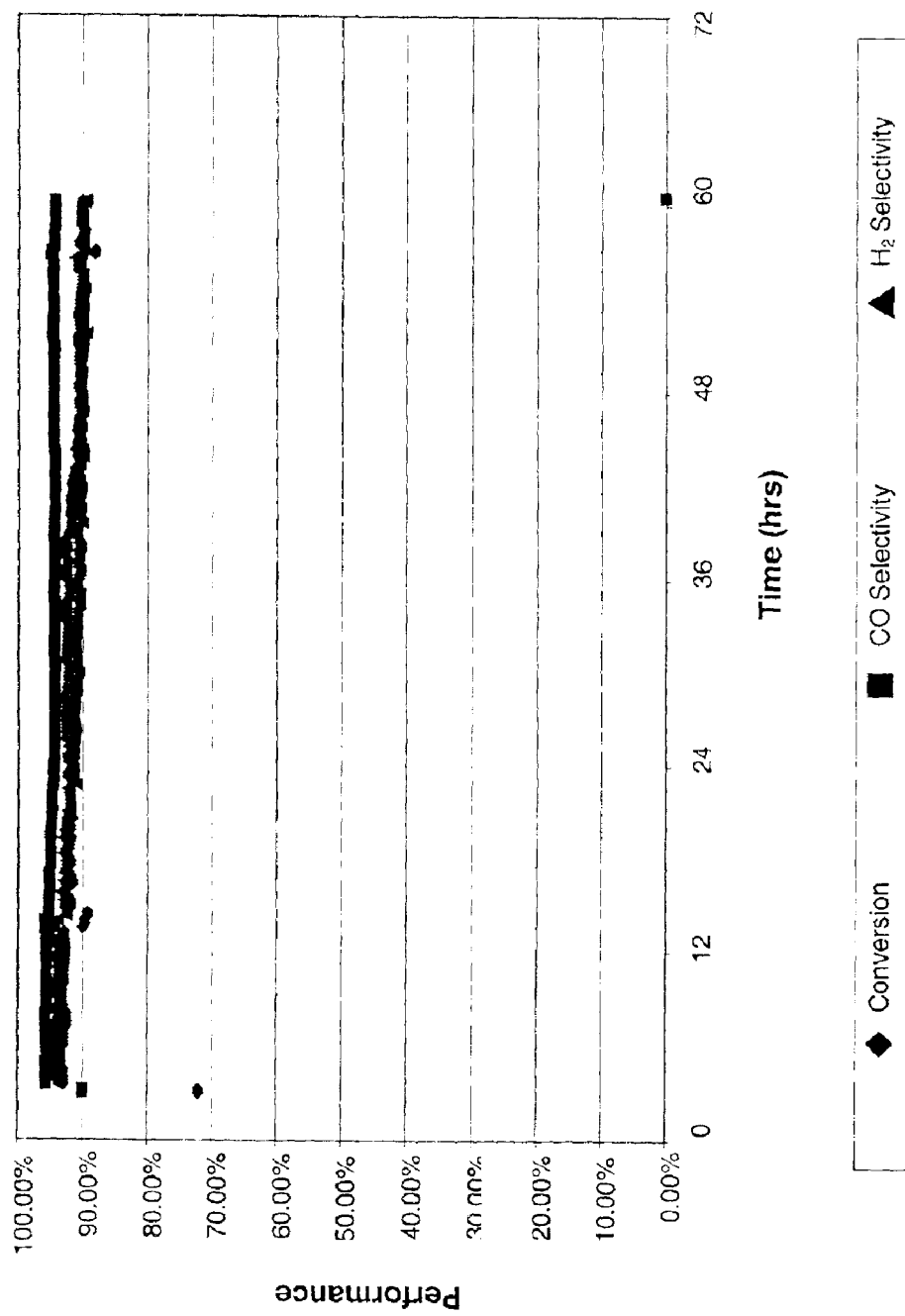
FIG. 7 is a performance graph for a catalyst containing 6.12 wt % Rh and 4.5 wt % $Sm_2O_3$ supported on 35–50 mesh $Al_2O_3$ granules.

The on-stream performance of an especially preferred composition comprises 6% Rh/4% Sm on $ZrO_2$ granules (Example 14(b)). The results of repeated tests of this catalyst are shown in FIGS. 6A, 6B. Another especially preferred granule supported catalyst comprises about 6% Rh/4% Sm on alumina granules (Example 16), the 3-day performance graph presented in FIG. 7.

The catalysts containing Rh/Sm supported on zirconia or alumina granules showed reproducibly superior results compared to their monolithic counterparts under the same testing conditions. The granule-supported catalysts can run at much higher space velocity than the similarly loaded monolith supported catalysts, which increases the productivity of the reactor. Other advantages of the granular catalysts include their ease of preparation, compared to monolithic catalysts, and the flexibility they provide to the user for process control and optimization of the geometry of the catalyst system in short contact time syngas production processes operated at superatmospheric pressure, preferably in excess of about 2 atmospheres. It appears that better dispersion of the active catalyst material is also achieved using granular supported catalysts. It is expected that similar granular supports can be successfully employed with syngas catalyst systems other than the Rh and lanthanide promoted systems exemplified herein.

Process of Producing Syngas

A process for producing synthesis gas employs a lanthanide-promoted rhodium-based monolith or granular catalyst that is active in catalyzing the efficient conversion of methane or natural gas and molecular oxygen to primarily CO and $H_2$ by a net catalytic partial oxidation (CPOX) reaction.

Suitable lanthanide-promoted Rh-based catalysts are prepared as described in the foregoing examples. Certain preferred catalysts comprise about 0.05–25 wt % rhodium and about 0.1–25 wt % lanthanide (based on total weight of the supported catalyst) on a support of partially stabilized zirconia (PSZ) (i.e., magnesium stabilized zirconia), zirconia stabilized alumina, yttrium stabilized zirconia, calcium stabilized zirconia, alumina (preferably alpha-alumina), cordierite, $ZrO_2$ or $TiO_2$. Some of the more preferred catalyst compositions comprise about 4–6 wt % Rh over a layer of 4–6 wt % lanthanide (Sm, Yb or Pr) deposited on a PSZ monolith or zirconia granules, especially 5.8 wt % Rh over 4.1 wt % Sm on zirconia granules.

Preferably employing a very fast contact (i.e., millisecond range)/fast quench (i.e., less than one second) reactor assembly, a feed stream comprising a hydrocarbon feedstock and an oxygen-containing gas are mixed together and contacted with a lanthanide-containing catalyst described below. One suitable reaction regime is a fixed bed reaction regime, in which the catalyst is retained within a reaction zone in a fixed arrangement. The preferred catalyst bed length to reactor diameter is $\leq \frac{1}{8}$. The feed stream is contacted with the catalyst in a reaction zone maintained at autothermal net partial oxidation-promoting conditions effective to produce an effluent stream comprising primarily carbon monoxide and hydrogen. The hydrocarbon feedstock may be any gaseous hydrocarbon having a low boiling point, such as methane, natural gas, associated gas, or other sources of light hydrocarbons having from 1 to 5 carbon atoms. The hydrocarbon feedstock may be a gas arising from naturally occurring reserves of methane, which contain carbon dioxide. Preferably, the feed comprises at least about 50% by volume methane, more preferably at least 75% by volume, and most preferably at least 85% by volume methane.

The hydrocarbon feedstock is in the gaseous phase when contacting the catalyst. The hydrocarbon feedstock is contacted with the catalyst as a mixture with an $O_2$ containing gas, preferably pure oxygen. The hydrocarbon feedstock may be contacted with the catalyst as a mixture containing steam and/or $CO_2$ along with a light hydrocarbon gas, as sometimes occurs in natural gas deposits.

The methane-containing feed and the $O_2$ containing gas are mixed in such amounts to give a carbon (i.e., carbon in methane) to oxygen (i.e., molecular oxygen) ratio from about 1.5:1 to about 3.3:1, more preferably, from about 1.7:1 to about 2.1:1. The stoichiometric molar ratio of about 2:1 ($CH_4$:$O_2$) is especially desirable in obtaining the net partial oxidation reaction products ratio of 2:1 $H_2$:CO. In some situations, such as when the methane-containing feed is a naturally occurring methane reserve, carbon dioxide may also be present in the methane-containing feed without detrimentally affecting the process. The process is operated at atmospheric or superatmospheric pressures, the latter being preferred. The pressures may be from about 100 kPa to about 32,000 kPa (about 1–320 atm), preferably from about 200 kPa to 10,000 kPa (about 2–100 atm).

The process is preferably operated at temperatures of from about 600° C. to about 2,000° C., preferably from about 600° C. to about 1,600° C. The hydrocarbon feedstock and the oxygen-containing gas are preferably pre-heated before contacting with the catalyst.

The hydrocarbon feedstock and the oxygen-containing gas may be passed over the catalyst at any of a variety of space velocities. Space velocities for the process, stated as gas hourly space velocity (GHSV), are from about 20,000 to about 100,000,000 $hr^{-1}$, preferably from about 100,000 to about 25,000,000 $hr^{-1}$. Although for ease in comparison with prior art systems space velocities at standard conditions have been used to describe the present invention, it is well recognized in the art that residence time is the inverse of space velocity and that the disclosure of high space velocities equates to low residence times on the catalyst. Under these operating conditions a flow rate of reactant gases is maintained sufficient to ensure a residence time of no more than 10 milliseconds with respect to each portion of reactant gas in contact with the catalyst system. The product gas mixture emerging from the reactor is harvested and may be routed directly into any of a variety of applications. One such application for the CO and $H_2$ product stream is for producing higher molecular weight hydrocarbon compounds using Fischer-Tropsch technology.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent applications and publications cited herein are incorporated by reference. The discussion of certain references in the Description of Related Art, above, is not an admission that they are prior art to the present invention, especially any references that may have a publication date after the priority date of this application.

What is claimed is:

1. A highly productive process for partially oxidizing a reactant gas mixture comprising methane and $O_2$ to form synthesis gas comprising carbon monoxide and hydrogen, the process comprising:

forming a reactant gas mixture comprising a light hydrocarbon containing gas and an $O_2$ containing gas, wherein the light hydrocarbon containing gas comprises methane;

in a reactor, passing said reactant gas mixture over a catalyst at a reactant gas pressure of at least 200 kPa, said catalyst comprising about 0.5–25 wt % rhodium (wt % rhodium metal based on total weight of the catalyst) and a lanthanide deposited on a refractory support;

maintaining a molar ratio of methane to $O_2$ in the range of about 1.5:1 to about 3.3:1, maintaining the gas hourly space velocity in excess of about 20,000 $hr^{-1}$, such that the partial oxidation of the methane proceeds with at least 85% methane conversion, 85% selectivity to carbon monoxide and 85% selectivity to hydrogen.

2. The process of claim 1, wherein the catalyst contains no more than 25 wt % lanthanide (wt % based on total weight of the supported catalyst).

3. The process of claim 1 wherein said catalyst comprises about 0.5–10 wt % lanthanide deposited on the refractory support (wt % based on total weight of the supported catalyst).

4. The process of claim 1 wherein said refractory support comprises a material chosen from the group consisting of zirconia, magnesium stabilized zirconia, zirconia stabilized alumina, yttrium stabilized zirconia, calcium stabilized zirconia, alumina, cordierite, titania, silica, magnesia, niobia and vanadia.

5. The process of claim 1 wherein said refractory support comprises at least one monolith.

6. The process of claim 1 wherein the catalyst is composed of a plurality of discrete structures.

7. The process of claim 1 wherein said pressure is up to about 32,000 kPa (about 320 atmospheres).

8. The process of claim 7 wherein said pressure is between 200–10,000 kPa (about 2–100 atmospheres).

9. The process of claim 1 wherein said light hydrocarbon containing gas comprises at least about 80% methane by volume.

10. The process of claim 1 wherein maintaining the gas hourly space velocity in excess of about 20,000 $hr^{-1}$ comprises passing said reactant gas mixture over said catalyst at a gas hourly space velocity up to about 100,000,000 $hr^{-1}$.

11. The process of claim 10 comprising passing said reactant gas mixture over said catalyst at a gas hourly space velocity in the range of 100,000–25,000,000 $hr^{-1}$.

12. The process of claim 11 further comprising maintaining autothermal catalytic partial oxidation promoting conditions.

13. The process of claim 12 further comprising preheating said reactant gas mixture before contacting said catalyst, and wherein said step of maintaining autothermal catalytic partial oxidation reaction promoting conditions comprises:

regulating the relative amounts of the light hydrocarbon and $O_2$ in said reactant gas mixture, regulating the preheating of said reactant gas mixture, regulating the operating pressure of said reactor, regulating the space velocity of said reactant gas mixture, and regulating the hydrocarbon composition of said light hydrocarbon containing gas.

14. The process of claim 12 wherein said step of maintaining autothermal catalytic partial oxidation reaction promoting conditions includes keeping the preheat temperature of the reactant gas mixture in the range of 30° C.–750° C. and the temperature of the catalyst in the range of 600–2,000° C.

15. The process of claim 14 wherein said step of maintaining catalytic partial oxidation reaction promoting conditions includes keeping the temperature of the catalyst in the range of 600–1,600° C.

16. The process of claim 1 comprising maintaining a reactant gas mixture/catalyst contact time of no more than 10 milliseconds.

17. The process of claim 1 wherein the catalyst comprises a lanthanide chosen from the group consisting of Sm, Pr and Yb.

18. The process of claim 17 wherein said lanthanide is samarium.

19. The process of claim 1 wherein the gas hourly space velocity is the range of about 100,000–25,000,000 $hr^{-1}$.

20. The process of claim 1 further comprising adding a combustible gas to said reactant gas mixture sufficient to initiate a net catalytic partial oxidation reaction.

21. The process of claim 1 wherein the catalyst comprises at least 0.005 wt % lanthanide (wt % based on total weight of the supported catalyst) disposed on the refractory support.

22. The process of claim 21 wherein the refractory support comprises an oxidized metal having an atomic number of less than 58, and the catalyst is constructed by a method that includes applying rhodium and lanthanide to the refractory support in separate steps wherein the first applied said rhodium or lanthanide is calcined prior to the application of the second of said rhodium or lanthanide, such that the resulting catalyst has a metal surface area of at least about 1.25 square meters of metal per gram of catalyst.

23. The process of claim 22 wherein the resulting catalyst has a metal surface area of at least about 1.5 square meters of metal per gram of catalyst.

24. The process of claim 23 wherein the resulting catalyst has a metal surface area of at least about 2.0 square meters of metal per gram of catalyst.

25. The process of claim 21 wherein said catalyst comprises about 0.005 to 25% of a lanthanide element selected from the group consisting of La, Ce, Pr, Nd, Pm, Sm, Eu, Gd, Tb, Dy, Ho, Er, Tm, Yb and Lu, said lanthanide being in the form of the metal, a metal oxide or combination thereof, and said rhodium and said lanthanide coat said refractory support, said refractory support being in the form of a refractory monolith or a plurality of discrete structures.

26. The process of claim 1 wherein forming said reactant gas mixture comprises mixing together said light hydrocarbon containing gas and said $O_2$-containing gas in a carbon::oxygen molar ratio of about 1.7:1 to about 2.1:1.

27. The process of claim 26 wherein said carbon:oxygen molar ratio is about 2:1.

28. The process of claim 1 wherein said partial oxidation of methane proceeds with at least 90% methane conversion, 90% selectivity to carbon monoxide and 90% selectivity to hydrogen.

29. The process of claim 28 wherein said partial oxidation of methane proceeds with at least 95% methane conversion, 95% selectivity to carbon monoxide and 95% selectivity to hydrogen.

30. The process of claim 1 wherein said light hydrocarbon containing gas comprises natural gas.

31. The process of claim 1 wherein the catalyst comprises at least one monolith.

32. The process of claim 1 wherein said lanthanide comprises a lanthanide metal, a lanthanide oxide or a combination thereof and said lanthanide is deposited between said support and said rhodium.

33. The process of claim 1 wherein said lanthanide comprises a lanthanide metal, a lanthanide oxide or a combination thereof, and wherein said rhodium is deposited between said support and said lanthanide.

34. The process of claim 1 wherein said lanthanide comprises a lanthanide metal a lanthanide oxide or a combination thereof, and wherein a mixture of said rhodium and said lanthanide is deposited on said support.

35. The process of claim 1, wherein the lanthanide comprises at least one lanthanide chosen from the group consisting of Pr, Nd, Pm, Sm, Eu, Gd, Tb, Dy, Ho, Er, Tm and Yb.

36. The process according to claim 1 wherein the catalyst comprises a plurality of discrete structures.

37. The process of claim 36 wherein the plurality of discrete structures comprises at least one geometry chosen from the group consisting of granules, spheres, beads, pills, pellets, cylinders, extrudates and trilobes.

38. The process according to claim 36 wherein the discrete structure is chosen from the group consisting of granules, spheres, beads, pills, pellets, cylinders, extrudates and trilobes.

39. The process according to claim 36 wherein the discrete structures comprise particles.

40. The process according to claim 36 wherein at least a majority of the discrete structures each have a maximum characteristic length of less than six millimeters.

41. The process according to claim 40 wherein at least a majority of the particulate material is generally spherical with a maximum diameter of less than about 3 millimeters.

42. The process of claim 36 wherein each said discrete structure is about 50 microns to 6 mm long in its longest characteristic dimension.

43. The process according to claim 1 wherein the catalyst contains 0.005–25 wt % lanthanide (wt % based on total weight of the catalyst).

44. The process of claim 43 wherein said catalyst comprises about 0.5–10 wt % rhodium (wt % based on total weight of the catalyst) and about 0.5–10 wt % samarium (wt % based on total weight of the catalyst) deposited on a refractory support.

45. The process of claim 1 wherein said catalyst is prepared according to a method comprising:
    applying a lanthanide precursor to said refractory support, to yield a first intermediate;
    thermally conditioning said first intermediate to yield a second intermediate;
    applying a rhodium precursor to said second intermediate to yield a third intermediate; and
    thermally conditioning said third intermediate to provide a stability-enhanced catalyst.

46. The process of claim 45 wherein said thermally conditioning comprises subjecting said catalyst, or an intermediate thereof, to at least one heat treatment, each said heat treatment including subjecting the catalyst, or an intermediate thereof, to a defined heating and cooling program.

47. The process of claim 46 wherein said at least one heat treatment comprises heating a catalyst intermediate at a predetermined heating rate up to a first temperature and heating a catalyst intermediate at a predetermined heating rate from said first temperature to a second temperature, and, optionally, applying at least one additional heat treatment to said catalyst or intermediate thereof.

48. The process of claim 47 comprising a final heat treatment that includes heating said catalyst to a temperature in the range of about 500–1,700° C.

49. The process of claim 47 wherein said thermally conditioning further comprises holding said catalyst at said temperatures for predetermined periods of time.

50. The process of claim 49 wherein the holding time at said first or second temperature is about 30–1,440 min.

51. The process of claim 50 wherein the holding time is about 60–240 min.

52. The process of claim 47 wherein said method of making includes a final heat treatment comprising subjecting the catalyst to a temperature a predetermined expected maximum reactor operating temperature.

53. The process of claim 47 wherein a second or subsequent temperature is about 500° C.–1,700° C.

54. The process of claim 45 wherein said the thermally conditioning comprises heating said second and/or third intermediate at a predetermined heating rate up to a first temperature and then heating said catalyst at a predetermined heating rate from said first temperature to a second temperature.

55. The process of claim 54 wherein said thermally conditioning further comprises holding said catalyst at said first and second temperatures for predetermined periods of time, wherein the temperatures employed for said second and third intermediates are the same or different.

56. The process of claim 55 wherein said holding at said first temperature is sufficient to decompose the rhodium or lanthanide precursor.

57. The process of claim 54 wherein the heating rate is about 0.1–50° C./min.

58. The process of claim 57 wherein the heating rate is about 1–5° C./min.

59. The process of claim 45 wherein said first temperature is in the range of about 125° C.–325° C. and the second temperature is in the range of about 300° C.–900° C.

60. The process of claim 1 wherein the lanthanide is other than lanthanum or cerium.

61. A method of converting a light hydrocarbon and $O_2$ to a product mixture containing CO and $H_2$, the process comprising:
    forming a reactant gas mixture comprising a light hydrocarbon containing gas and an $O_2$ containing gas; and
    in a reactor, passing said reactant gas mixture at a pressure of at least two atmospheres over a catalyst comprising:
    about 0.5–25 wt % rhodium (wt % rhodium metal based on total weight of the catalyst),
    about 0.005–25 wt % lanthanide metal, lanthanide oxide, or combination thereof (wt % lanthanide metal based on total weight of the catalyst), wherein said lanthanide is selected from the group consisting of La, Ce, Pr, Nd, Pm, Sm, Eu, Gd, Tb, Dy, Ho, Er, Tm, Yb and Lu, and
    a refractory support comprising a plurality of discrete structures, wherein each said discrete structure is about 50 microns to 6 mm long in its longest characteristic dimension, and
    wherein said catalyst is prepared by a method comprising applying to said refractory support a rhodium precursor compound and a precursor compound of said lanthanide metal, lanthanide oxide, or combination thereof, wherein one of said precursor compounds is applied and stabilized on the refractory support before the other precursor compound is applied.

62. The method of claim 61 wherein said method of preparing said catalyst comprises reducing the catalyst in a hydrogen containing gas at a temperature above about 200° C.

63. The method of claim 61 further comprising maintaining said reactant gas mixture at a pressure in the range of 200–10,000 kPa (about 2–100 atmospheres).

64. The process of claim 61 wherein said catalyst comprises about 0.5–10 wt % lanthanide metal, lanthanide oxide, or combination thereof (wt % lanthanide metal based on total weight of the catalyst).

65. The process of claim 61 wherein said catalyst comprises about 0.5–10 wt % rhodium (wt % rhodium metal based on total weight of the catalyst).

66. The process of claim 61 wherein the lanthanide is other than lanthanum or cerium.

67. The process of claim 61 wherein the ratio of rhodium to lanthanide is in the range of about 0.5–2.

68. The process of claim 61 wherein said step of applying a rhodium precursor compound and a precursor compound of a lanthanide metal, a lanthanide oxide or a combination thereof includes applying said lanthanide precursor between said rhodium precursor and said support.

69. The process of claim 61 wherein said step of applying a rhodium precursor compound and a precursor compound of a lanthanide metal, a lanthanide oxide or a combination thereof includes applying said rhodium precursor between said lanthanide precursor and said support.

70. The process of claim 61 wherein said step of applying a rhodium precursor compound and a precursor compound of a lanthanide metal, a lanthanide oxide or a combination thereof includes applying a mixture of said lanthanide precursor and said rhodium precursor to said support.

71. The process of claim 61 wherein said pressure is about 45 psig (2.72 atm) to about 125 psig (8.51 atm).

72. The process of claim 61 wherein said catalyst comprises a rhodium concentration in the range of about 4–6 wt % and a lanthanide concentration in the range of about 4–6 wt % based on the total catalyst weight.

73. The method of claim 61 wherein said stabilizing comprises thermally conditioning said catalyst.

74. The method of claim 73 wherein said thermally conditioning comprises subjecting said catalyst, or an intermediate thereof, to at least two heat treatments, each aid heat treatment including subjecting the catalyst, or an intermediate thereof, to a defined heating and cooling program.

75. The method of claim 74 wherein said at least two heat treatment comprise heating a catalyst intermediate at a predetermined heating rate up to a first temperature and heating a catalyst intermediate at a predetermined heating rate from said first temperature to a second temperature, and, optionally, applying at least one additional heat treatment to said catalyst or intermediate thereof.

76. The method of claim 75 wherein the heating rate is about 1–5° C./min.

77. The method of claim 75 comprising a final heat treatment that includes heating said catalyst to a temperature in the range of about 500–1,700° C.

78. The method of claim 75 wherein the heating rate is about 0.1–50° C./min.

79. The method of claim 75 wherein said second temperature is about 500° C.–700° C.

80. The method of claim 75 wherein the first temperature is about 125° C.–325° C. and the second temperature is about 300° C.–900° C.

81. The method of claim 75 wherein said thermally conditioning further comprises holding said catalyst at said temperatures for predetermined periods of time.

82. The method of claim 81 wherein the first temperature is sufficient to decompose the rhodium or lanthanide precursor compound.

83. The method of claim 81 wherein the holding time at the first to second temperature is about 30–1,440 min.

84. The method of claim 81 wherein the holding time is about 60–240 min.

85. A supported catalyst active for catalyzing the partial oxidation of methane to CO and $H_2$ when employed in the catalyst zone of a short contact time reactor under catalytic partial oxidation promoting conditions, said catalyst comprising about 0.5–25 wt % rhodium (wt % rhodium based on total weight of the supported catalyst) and about 0.005–25 wt % lanthanide, lanthanide oxide, or combination thereof (wt % lanthanide metal base on total weight of the supported catalyst), deposited on a refractory support comprising a plurality of discrete structures, wherein each said discrete structure is about 50 microns to about 6 millimeters long in its longest characteristic dimension, and wherein the refractory support is chosen from the group consisting of zirconia, magnesium stabilized zirconia, zirconia stabilized alumina, yttrium stabilized zirconia, calcium stabilized zirconia, alumina, cordierite, magnesia, titania, niobia, vanadia and silica.

86. The catalyst of claim 85 wherein said lanthanide is at least one element chosen from the group consisting of Pr, Nd, Pm, Sm, Eu, Gd, Tb, Dy, Ho, Er, Tm and Yb.

87. The catalyst of claim 85 wherein said lanthanide and/or lanthanide oxide is deposited intermediate said support and said Rh.

88. The catalyst of claim 85 wherein said Rh is deposited intermediate said support and said lanthanide and/or lanthanide oxide.

89. The catalyst of claim 85 wherein a mixture of said lanthanide and/or lanthanide oxide and said Rh is deposited on said support.

90. The catalyst of claim 85 wherein said lanthanide comprises samarium, ytterbium or praseodymium.

91. The catalyst of claim 85 wherein said discrete structures are chosen from the group consisting of particles, granules, pellets, pills, beads, trilobes, cylinders, extrudates and spheres.

92. The catalyst of claim 85 wherein said alumina is alpha-alumina.

93. The catalyst of claim 85 wherein the lanthanide and/or lanthanide oxide is chosen from the group consisting of La, Ce, Pr, Nd, Pm, Sm, Eu, Gd, Tb, Ly, Ho, Er, Tm and Yb, and oxides thereof.

94. The catalyst of claim 85 wherein the lanthanide and/or lanthanide oxide comprises at least one lanthanide or lanthanide oxide chosen from the group consisting of samarium, ytterbium and praseodymium, and oxides thereof.

95. The catalyst of claim 85 comprising about 0.5–10 wt % rhodium (wt % rhodium metal based on total weight of the catalyst).

96. The catalyst of claim 85 comprising about 0.1–25 wt % lanthanide metal, lanthanide oxide, or combination thereof (wt % lanthanide metal based on total weight of the catalyst).

97. The catalyst of claim 96 comprising about 0.5–10 wt % lanthanide metal, lanthanide oxide, or combination thereof (wt % lanthanide metal based on total weight of the catalyst).

* * * * *

UNITED STATES PATENT AND TRADEMARK OFFICE
CERTIFICATE OF CORRECTION

PATENT NO.   : 6,946,114 B2
DATED        : September 20, 2005
INVENTOR(S)  : Joe D. Allison et al.

It is certified that error appears in the above-identified patent and that said Letters Patent is hereby corrected as shown below:

Column 27,
Lines 26-27, "composed" should read -- comprised --.

Column 28,
Line 32, "25%" should read -- 25 wt% --.

Column 31,
Line 30, "aid" should read -- said --.
Line 48, "700ºC" should read -- 1,700ºC --.

Column 32,
Line 42, "Ly" should read -- Dy --.

Signed and Sealed this

Twenty-second Day of November, 2005

JON W. DUDAS
*Director of the United States Patent and Trademark Office*